(12) United States Patent  
Horiguchi

(10) Patent No.: US 6,883,043 B2  
(45) Date of Patent: Apr. 19, 2005

(54) INFORMATION PROCESSING APPARATUS INCORPORATED IN A CONTROL UNIT STORING AN AUTHENTICATION INFORMATION AND TRANSMITTING A COMMAND TO REQUEST AN ACCESS RIGHT WHEN A FIRST MODE IS SET

(75) Inventor: Masato Horiguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 303 days.

(21) Appl. No.: 09/948,192

(22) Filed: Sep. 7, 2001

(65) Prior Publication Data

US 2002/0078272 A1 Jun. 20, 2002

(30) Foreign Application Priority Data

Sep. 8, 2000 (JP) ........................................ 2000-272958

(51) Int. Cl.[7] ........................... G06F 13/14; G06F 12/14
(52) U.S. Cl. ........................... 710/37; 710/36; 713/168; 713/200
(58) Field of Search ........................... 710/36, 37, 105, 710/200, 8, 10; 711/152, 163, 164, 147; 713/168, 170, 200–202, 182, 185; 709/213–216

(56) References Cited

U.S. PATENT DOCUMENTS 5,608,388 A * 3/1997 Nakajima .............. 340/825.52
6,047,376 A * 4/2000 Hosoe .......................... 713/201
6,453,369 B1 * 9/2002 Imamura et al. ................ 710/36
6,463,540 B1 * 10/2002 Lelong et al. ............... 713/200

* cited by examiner

Primary Examiner—Ilwoo Park
(74) Attorney, Agent, or Firm—Frommer Lawrence & Haug LLP; William S. Frommer

(57) ABSTRACT

In a network implemented based on IEEE 1394, when an HDD is connected to a personal computer via an IEEE 1394 connection unit and a GUID terminal connection unit, the HDD obtains a GUID via the GUID terminal connection unit. When the personal computer requests acquisition of an access right, the HDD obtains a GUID via the IEEE 1394 connection unit, and compares it with the GUID obtained via the GUID terminal connection unit, and since the GUIDs match, the HDD assigns an access right to the personal computer. Even if another personal computer not connected to the HDD via the GUID terminal connection unit, transmits a GUID to the HDD via the IEEE 1394 connection unit, because the GUID differs from that of the personal computer connected to the HDD via the GUID terminal connection unit, an access right is not assigned to the personal computer not connected to the HDD via the GUID terminal connection unit.

18 Claims, 16 Drawing Sheets

INFORMATION PROCESSING APPARATUS INCORPORATED IN A CONTROL UNIT STORING AN AUTHENTICATION INFORMATION AND TRANSMITTING A COMMAND TO REQUEST AN ACCESS RIGHT WHEN A FIRST MODE IS SET

BACKGROUND OF THE INVENTION

1. Field of the Invention

The present invention relates to information processing apparatuses and methods, information processing systems, and program storage media. More specifically, the present invention relates to an information processing apparatus and method, an information processing system, and a program storage medium which allow a predetermined information processing apparatus to acquire an access right to another predetermined information processing apparatus on a network implemented by an IEEE (Institute of Electrical and Electronic Engineers) 1394 high-speed serial bus.

2. Description of the Related Art

Networks based on SBP-2 (Serial Bus Protocol 2) are being more commonly used. SBP-2 is a communications protocol which is believed to be optimal for a connection implemented by an IEEE 1394 high-speed serial bus standard (hereinafter also referred to simply as IEEE 1394).

FIG. 1 shows a network implemented by connecting personal computers and an HDD compatible with the conventional SBP-2 based on IEEE 1394. A personal computer 1a is connected to an HDD (Hard Disk Drive) 2 via an IEEE 1394 connection unit 3. Although the HDD 2 is shown separately in the figure in order to show the connection with the personal computer 1a, the HDD 2 is actually incorporated in and mounted on the personal computer 1a. The personal computer 1a and a personal computer 1b (hereinafter simply referred to as a personal computer 1 unless a distinction therebetween is necessary, and the same applies to other apparatuses) are connected to each other via an IEEE 1394 cable 4.

According to the SBP-2 standard, for example, on the network implemented as shown in FIG. 1, a device which initiates an action (transmits an operation command), such as the personal computer 1, is referred to as an "initiator", and a device which operates based on the command from the initiator, such as the HDD 2, is referred to as a "target".

In the network implemented as shown in FIG. 1, a target is allowed to accept an access from only one initiator (i.e., a target cannot be shared by a plurality of initiators). That is, of the personal computers 1a and 1b, a personal computer 1 which has accessed the HDD 2 earlier occupies the access right to the HDD 2 (a race condition), thereby determining the access right.

Based on the Race condition, for example, in the network shown in FIG. 1, if the personal computer 1b accesses the HDD 2 first, the personal computer 1a, even though it incorporates the HDD 2, is not allowed to access the HDD 2 incorporated therein, the access right being occupied by the personal computer 1b connected via the network.

In order to overcome this problem, it has been proposed that the access right be set in the order of connections based on IEEE 1394. However, the setting changes when the order of connection is changed, failing to provide a fundamental solution to the problem.

Furthermore, in order to solve the problem, it has also been proposed that the access right be set only to initiators which request an access right with a correct password using the password function provided in the SBP-2 standard. However, if the password is known to a plurality of initiators, similarly to the above, of the initiators to which the password is known, the initiator which has accessed first occupies the access right to a target, failing to provide a fundamental solution to the problem.

SUMMARY OF THE INVENTION

The present invention has been made in view of the above, and an object thereof is to provide an information processing apparatus and method, an information processing system, and a program storage medium which allow a predetermined initiator to acquire an access right to a predetermined target on a network implemented based on SBP-2.

To this end, the present invention, in one aspect thereof, provides an information processing apparatus which is directly connected to one of a plurality of other information processing apparatuses connected to each other via a bus, and which is also connected thereto via the bus. The information processing apparatus includes an input unit for inputting unique identification information output from the one of the plurality of other information processing apparatuses; a setting unit for setting a mode; and a holding unit for holding the identification information input from the input unit if a first mode has been set by the setting unit.

Preferably, the information processing apparatus further includes a detecting unit for detecting a connection to the one of the plurality of other information processing apparatuses, so that the setting unit sets the first mode when the detecting unit detects a connection to the one of the plurality of other information processing apparatuses while the setting unit sets a second mode when the detecting unit detects no connection to the one of the plurality of other information processing apparatuses.

More preferably, the information processing apparatus further includes an obtaining unit for obtaining the identification information from the one of the plurality of other information processing apparatuses via the bus; a comparing unit for comparing the identification information obtained by the obtaining unit with identification information held in the holding unit; and an output unit for outputting a signal which permits control of the information processing apparatus to the one of the plurality of other information processing apparatuses via the bus based on the result of the comparison by the comparing unit.

The setting unit may allow setting of the mode by a manual operation.

The bus may an IEEE 1394 high-speed serial bus, and the identification information may be GUID.

The present invention, in another aspect thereof, provides an information processing method for an information processing apparatus which is directly connected to one of a plurality of other information processing apparatuses connected to each other via a bus, and which is also connected thereto via the bus. The information processing method includes the steps of inputting unique identification information output from the one of the other information processing apparatuses; setting a mode; and holding the identification information input in the inputting step if a first mode has been set in the setting step.

The present invention, in yet another aspect thereof, provides a program storage medium storing a computer-readable program for controlling an information processing apparatus which is directly connected to one of a plurality of other information processing apparatuses connected to each other via a bus, and which is also connected thereto via the bus. The program includes the steps of inputting unique identification information output from the one of the plurality of other information processing apparatuses; setting a mode; and holding the identification information input in the inputting step if a first mode has been set in the setting step.

The present invention, in a further aspect thereof, provides an information processing apparatus which is connected to a plurality of other information processing apparatuses via a bus, and which is also directly connected to one of the plurality of other information processing apparatuses. The information processing apparatus includes a storing unit for storing unique identification information of its own; a detecting unit for detecting a direct connection of the one of the plurality of other information processing apparatuses; and a supplying unit for supplying the identification information stored in the storing unit to the one of the plurality of other information processing apparatuses directly connected, and storing the identification information therein.

The bus may be an IEEE 1394 high-speed serial bus, and the identification information may be GUID.

The present invention, in another aspect thereof, provides an information processing method for an information processing apparatus which is connected to a plurality of other information processing apparatuses via a bus, and which is also directly connected to one of the plurality of other information processing apparatuses. The information processing method includes the steps of storing unique identification information of its own; detecting a direct connection of the one of the plurality of other information processing apparatuses; and supplying the identification information stored in the storing step to the one of the plurality of other information processing apparatuses directly connected, and storing the identification information therein.

The present invention, in yet another aspect thereof, provides a program storage medium storing a computer-readable program for controlling an information processing apparatus which is connected to a plurality of other information processing apparatuses via a bus, and which is also directly connected to one of the plurality of other information processing apparatuses. The program includes the steps of storing unique identification information of its own; detecting a direct connection of the one of the plurality of other information processing apparatuses; and supplying the identification information stored in the storing step to the one of the other information processing apparatuses directly connected, and storing the identification information therein.

The present invention, in a yet further aspect thereof, provides an information processing system including a plurality of second information processing apparatuses connected to each other via a bus, and a first information processing apparatus which is directly connected to one of the plurality of second information processing apparatuses and which is also connected thereto via the bus. The first information processing apparatus includes an input unit for inputting unique identification information output from the one of the plurality of second information processing apparatuses; a setting unit for setting a mode; and a holding unit for holding the identification information input from the input unit if a first mode has been set by the setting unit. The one of the plurality of second information processing apparatuses includes a storing unit for storing unique identification information of its own; a detecting unit for detecting a direct connection of the first information processing apparatus; and a supplying unit for supplying the identification information stored in the storing unit to the first information processing apparatus directly connected, and storing the identification information therein.

Preferably, the information processing system further includes a detecting unit for detecting a connection to the one of the plurality of second information processing apparatuses, so that the setting unit sets the first mode when the detecting unit detects a connection to the one of the plurality of second information processing apparatuses while the detecting unit sets a second mode when the detecting unit detects no connection to the one of the plurality of second information processing apparatuses.

More preferably, the information processing system further includes an obtaining unit for obtaining the identification information from the one of the plurality of second information processing apparatuses via the bus; a comparing unit for comparing the identification information obtained by the obtaining unit with identification information held in the holding unit; and an output unit for outputting a signal which allows control of the first information processing apparatus to the one of the plurality of second information processing apparatuses via the bus based on the result of the comparison by the comparing unit.

The setting unit may allow setting of the mode by a manual operation.

The bus may be an IEEE 1394 high-speed serial bus, and the identification information may be GUID.

The present invention, in another aspect thereof, provides an information processing method for an information processing system including a plurality of second information processing apparatuses connected to each other via a bus, and a first information processing apparatus which is directly connected to one of the plurality of second information processing apparatuses and which is also connected thereto via the bus. The information processing method for the information processing system includes an information processing method for the first information processing apparatus and an information processing method for the one of the plurality of second information processing apparatuses. The information processing method for the first information processing apparatus includes the steps of inputting unique identification information output from the one of the plurality of second information processing apparatuses; setting a mode; and holding the identification information input in the inputting step if a first mode has been set in the setting step. The information processing method for the one of the plurality of second information processing apparatuses includes the steps of storing unique identification information of its own; detecting a direct connection of the first information processing apparatus; and supplying the identification information stored in the storing step to the first information processing apparatus directly connected, and storing the identification information therein.

The present invention, in yet another aspect thereof, provides a program storage medium storing a computer-readable program for controlling an information processing system including a plurality of second information processing apparatuses connected to each other via a bus, and a first information processing apparatus which is directly connected to one of the plurality of second information processing apparatuses and which is also connected thereto via the bus. The program for controlling the information processing system includes a program for the first information processing apparatus and a program for the one of the second information processing apparatuses. The program for the first information processing apparatus includes the steps of inputting unique identification information output from the one of the second information processing apparatuses; setting a mode; and holding the identification information input in the inputting step if a first mode has been set in the setting step. The program for the one of the plurality of second information processing apparatuses includes the steps of storing unique identification information of its own; detecting a direct connection of the first information processing apparatus; and supplying the identification information stored in the storing step to the first information processing apparatus directly connected, and storing the identification information therein.

According to the first information processing apparatus and method, and program storage medium of the present invention, the unique identification information output from one of the other information processing apparatuses is input, a mode is set, and the identification information which has been input is held when a first mode has been set.

According to the second information processing apparatus and method, and program storage medium of the present invention, the unique identification information of its own is stored, a direct connection of one of the other information processing apparatuses is detected, and the identification information which has been stored is supplied to and stored in the one of the other information processing apparatuses directly connected.

According to the information processing system and method, and program storage medium of the present invention, the first information processing apparatus inputs the unique identification information output from one of the second information processing apparatuses, sets a mode, and holds the identification information which has been input when the first mode has been set, and the one of the second information processing apparatuses stores the unique identification information of its own, detects a direct connection of the first information processing apparatus, and supplies the identification information which has been stored to the first information processing apparatus directly connected, and stores the identification information therein.

In accordance with any of the above, in a network implemented by an IEEE 1394 high-speed serial bus conforming to the SBP2 standard, a predetermined information processing apparatus is allowed to acquire an access right to another predetermined information processing apparatus.

DESCRIPTION OF THE PREFERRED EMBODIMENT

Figure 2:
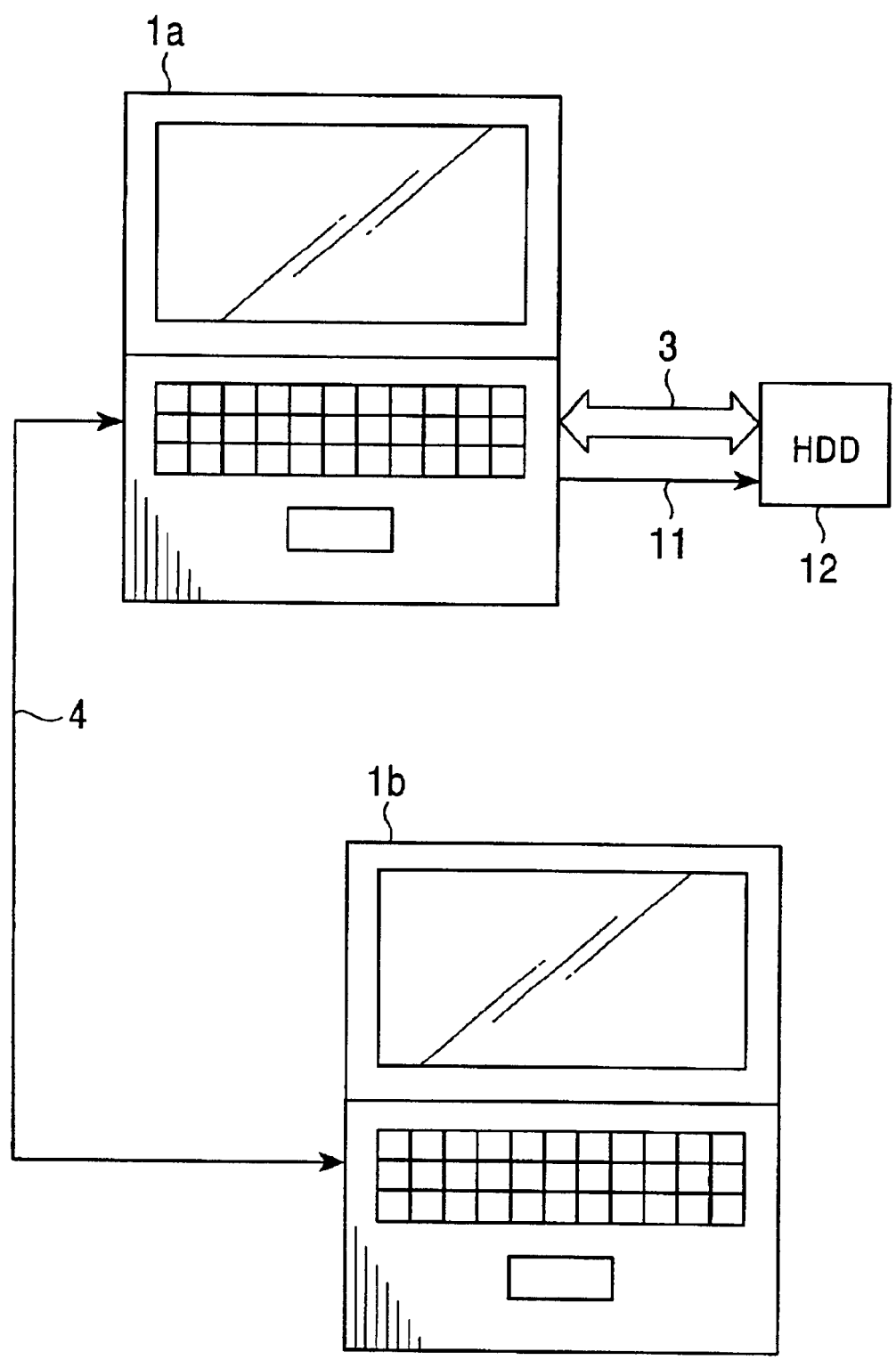
FIG. 2 is a block diagram showing the construction of an information processing system implemented based on IEEE 1394, according to an embodiment of the present invention.

FIG. 2 is a diagram showing the configuration of a network implemented based on IEEE 1394 and conforming to the SBP-2, according to an embodiment of the present invention. In the description hereinafter, components corresponding to those in the conventional art are designated by the same numerals, and the descriptions thereof will be omitted as appropriate.

Figure 1:
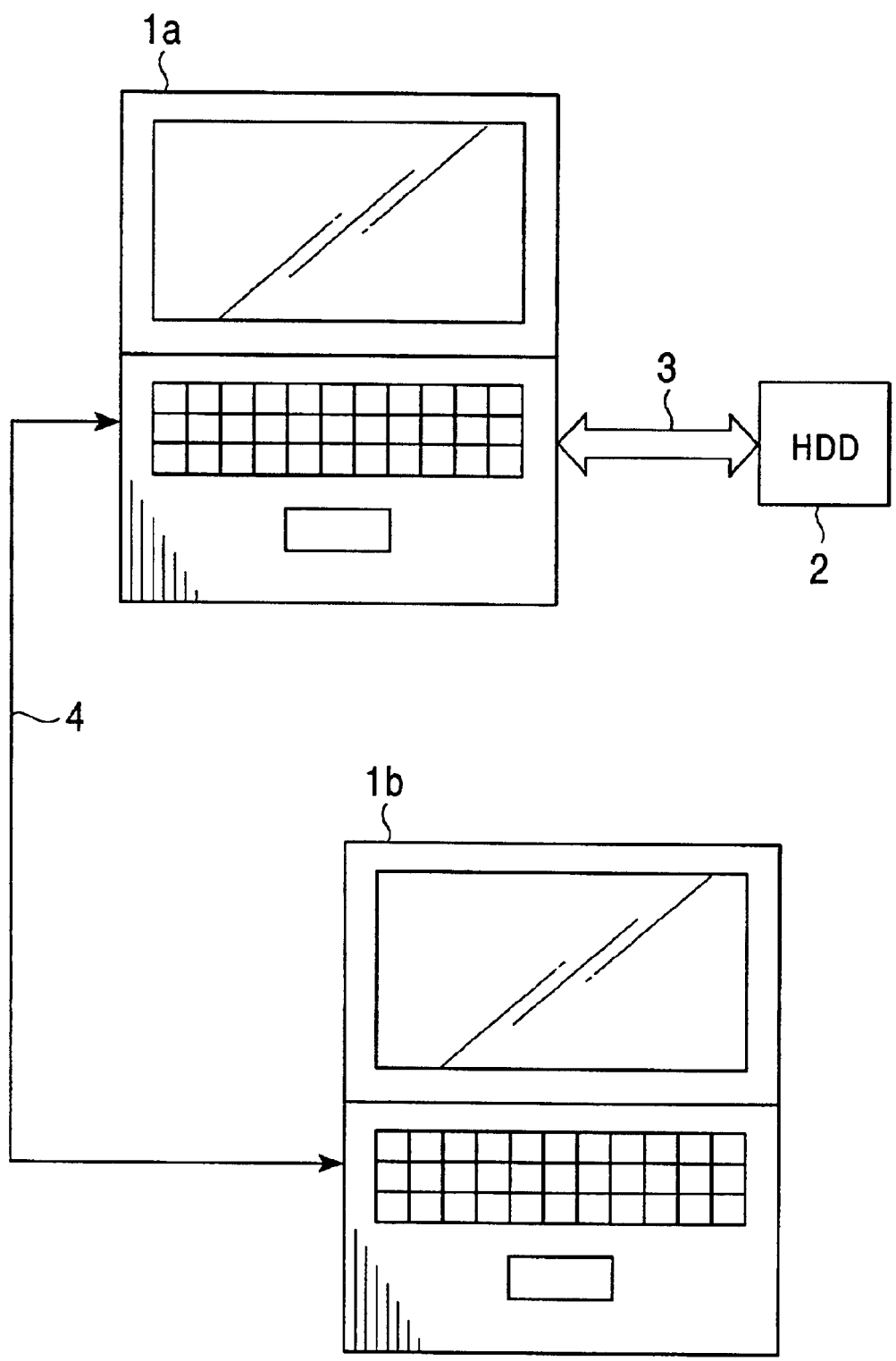
FIG. 1 is a block diagram showing an example of a conventional information processing system implemented based on IEEE 1394.

The configuration shown in FIG. 2 differs from the configuration shown in FIG. 1 in that the HDD 2 is replaced by an HDD 12, and in that in addition to the conventional IEEE 1394 connection unit 3, a GUID (Global Unique Identifier) terminal connection unit 11 is provided for the connection of the personal computer 1a and the HDD 12.

A GUID is global identification information for identifying the type, manufacturer, product number, serial number, etc. of any device connected based on IEEE 1394. The GUID of the personal computer 1a which functions as an initiator is output to the HDD 12 via the GUID terminal connection unit 11.

Figure 3:
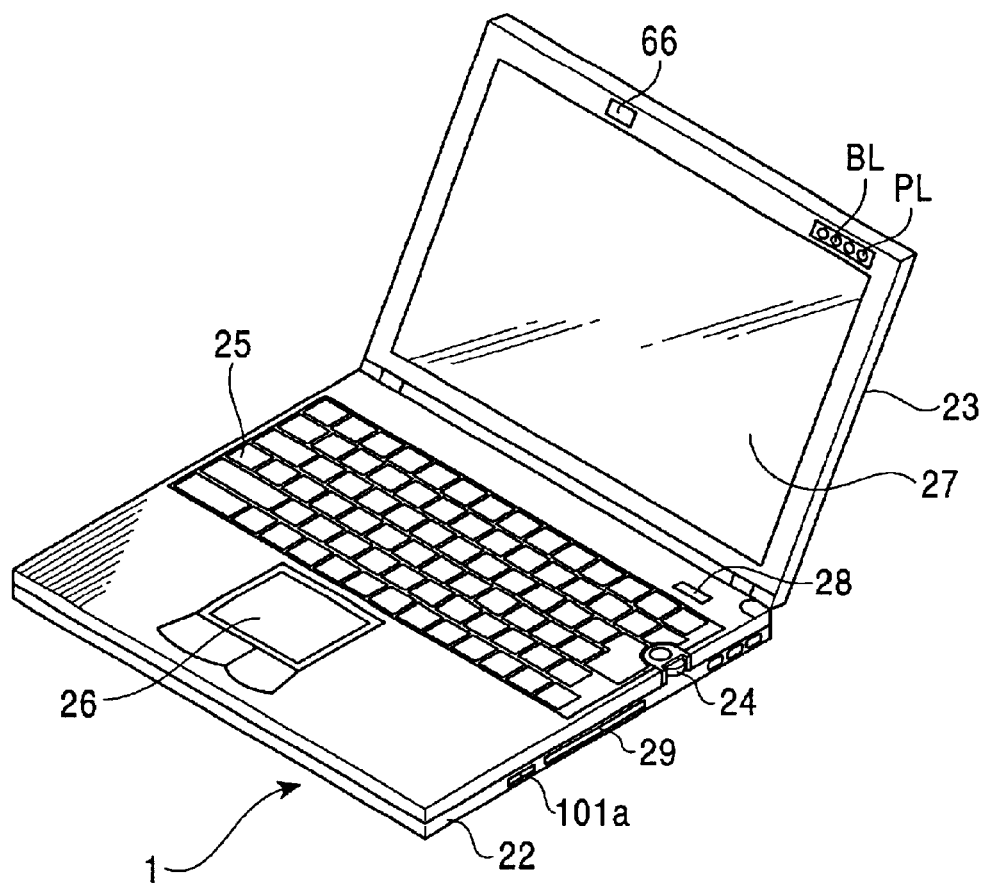
FIG. 3 is a diagram showing the construction of a personal computer shown in FIG. 2.
Figure 4:
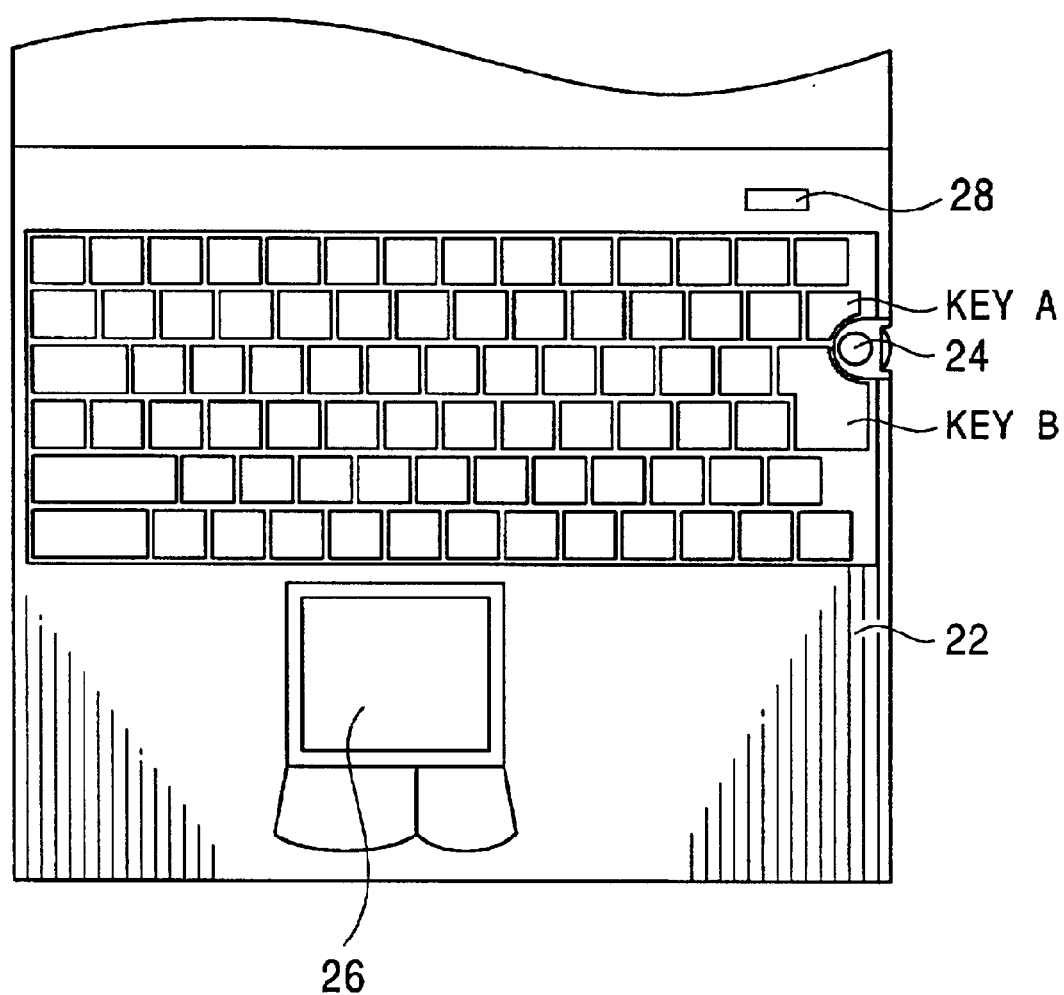
FIG. 4 is a diagram showing the construction of a personal computer shown in FIG. 2.
Figure 5:
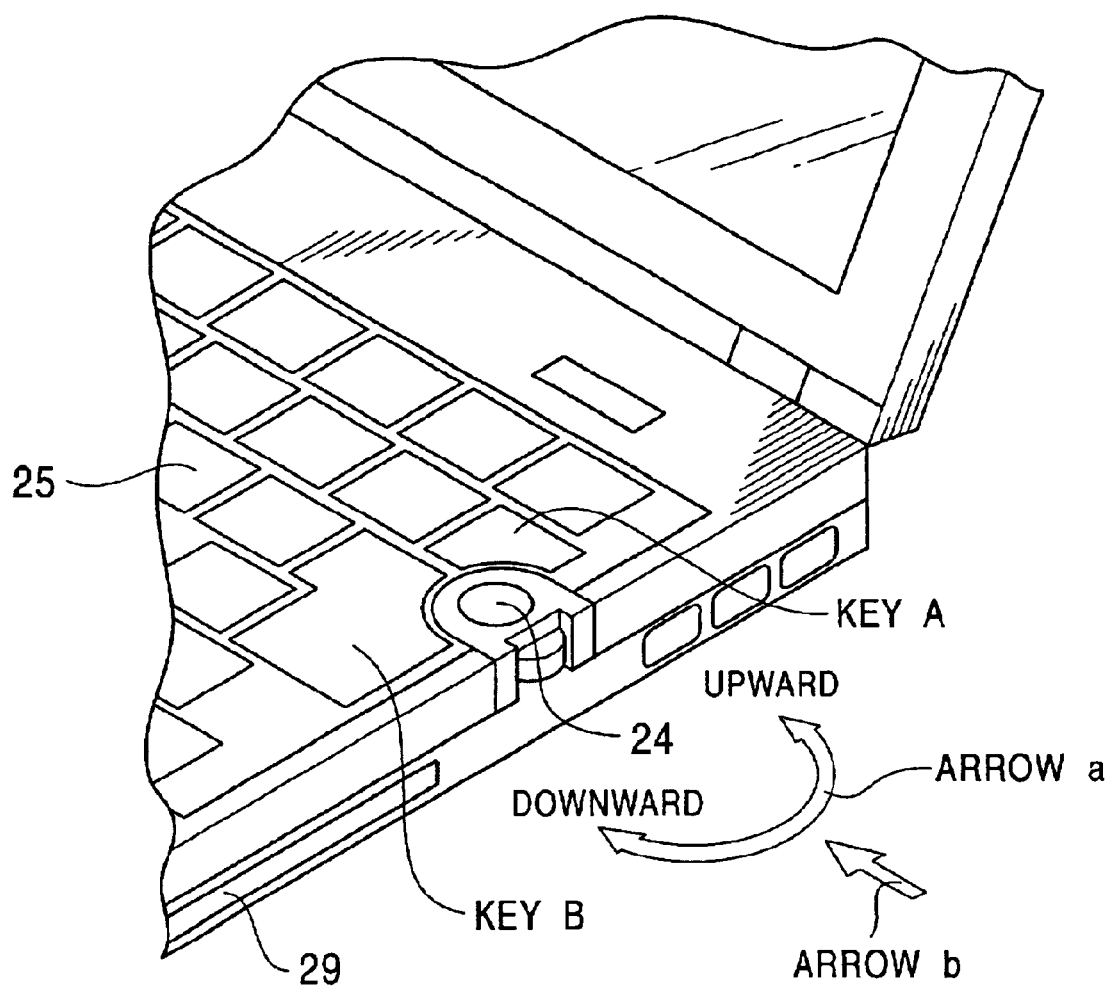
FIG. 5 is a diagram showing the construction of the personal computer shown in FIG. 2.
Figure 6:
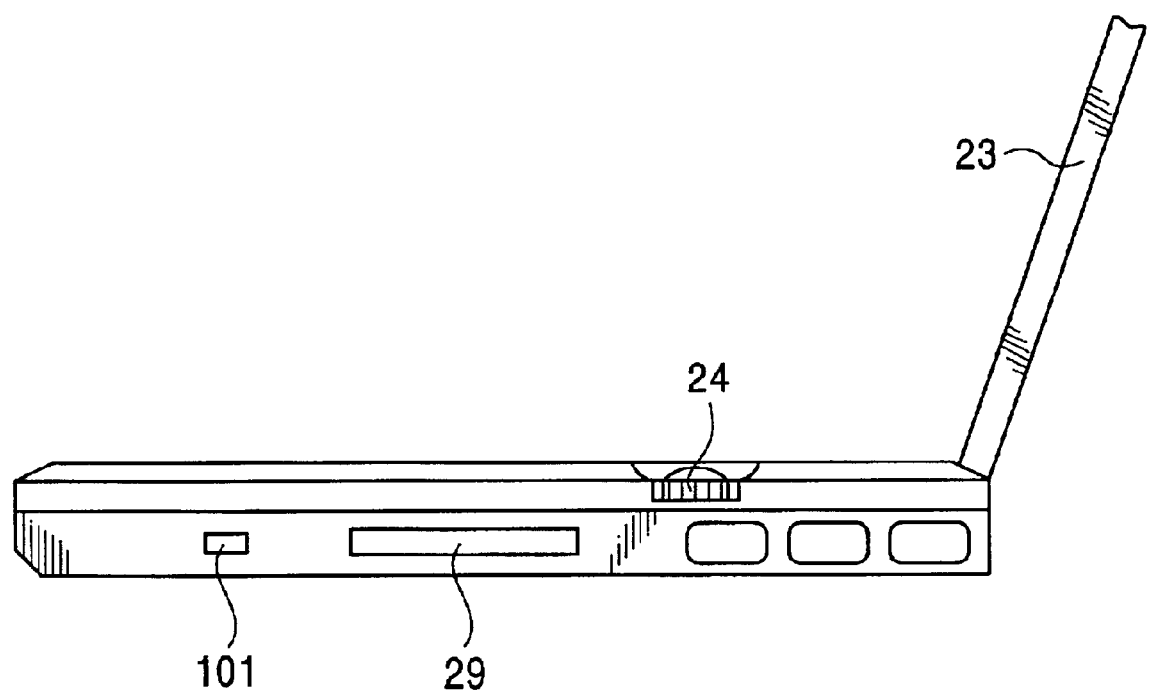
FIG. 6 is a diagram showing the construction of the personal computer shown in FIG. 2.

Next, with reference to FIGS. 3 to 6, the construction of the personal computer 1 will be described. The personal computer 1 is primarily constructed of a main unit 22, and a display unit 23 which can be opened and closed with respect to the main unit 22. FIG. 3 is an external perspective view in which the display unit is shown as opened with respect to the main unit 22. FIG. 4 is a plan view of the main unit 22, and FIG. 5 is an enlarged view of the proximity of a jog dial 24 provided on the main unit 22, to be described later. FIG. 6 is a side view of the main unit 22 on the side of the jog dial 24.

The main unit 22 is provided with, on the top surface thereof, a key board 25 which is operated when entering various characters and symbols, a touch pad 26 which serves as a pointing device operated when, for example, moving a pointer (mouse cursor), and a power switch 28. Furthermore, the main unit 22 is provided with, on a side surface thereof, the jog dial 24, an IEEE 1394 port 101a, etc. As an alternative to the touch pad 26, for example, a stick-type pointing device may be provided. Furthermore, although not shown in FIG. 3, an IEEE 1394 port 101b is provided for connection of an internal device, the IEEE 1394 port 101b for an internal device and an IEEE 1394 terminal 201a (FIG. 8) of the HDD 12 being connected to form the IEEE 1394 connection unit 3.

Furthermore, on the front surface of the display unit 23, an LCD (Liquid Crystal Display) 27 for displaying images is provided. On the top right portion of the display unit 23, a power lamp PL, a battery lamp BL, and as required, a message lamp ML, and other lamps implemented by LEDs are provided. Furthermore, on the top portion of the display unit 23, a microphone 66 is provided. The power lamp PL, the battery lamp BL, the message lamp ML, etc. may be provided on the bottom portion of the display unit 23.

The jog dial 24 is fitted between keys of the keyboard 25 on the main unit 22, and is fixed so that the height thereof is substantially the same as that of the keys. The jog dial 24 executes a predetermined process in accordance with a rotation operation indicated by an arrow a shown in FIG. 5, and also executes a process in accordance with a movement operation indicated by an arrow b. The jog dial 24 may be provided on the left side surface of the main unit 22, or on the left or right surface of the display unit 23 including the LCD 27, or in the longitudinal direction between the G key and H key of the key board 25.

Furthermore, the jog dial 24 may be provided, so as to allow operation thereof by the thumb while operating the touch pad 26 by the forefinger, on the center portion of the front surface, in the lateral direction along the top end or the bottom end of the touch pad 26, or in the longitudinal direction between the right button and the left button of the touch pad 26. Furthermore, without limitation to the longitudinal direction and the lateral direction, the jog dial 24 may be provided in an oblique direction at a predetermined angle so as to facilitate operation by fingers. Furthermore, the jog dial 24 may be provided at a position on a side surface of the mouse used which serves as a pointing device so as to allow operation thereof by the thumb.

Figure 7:
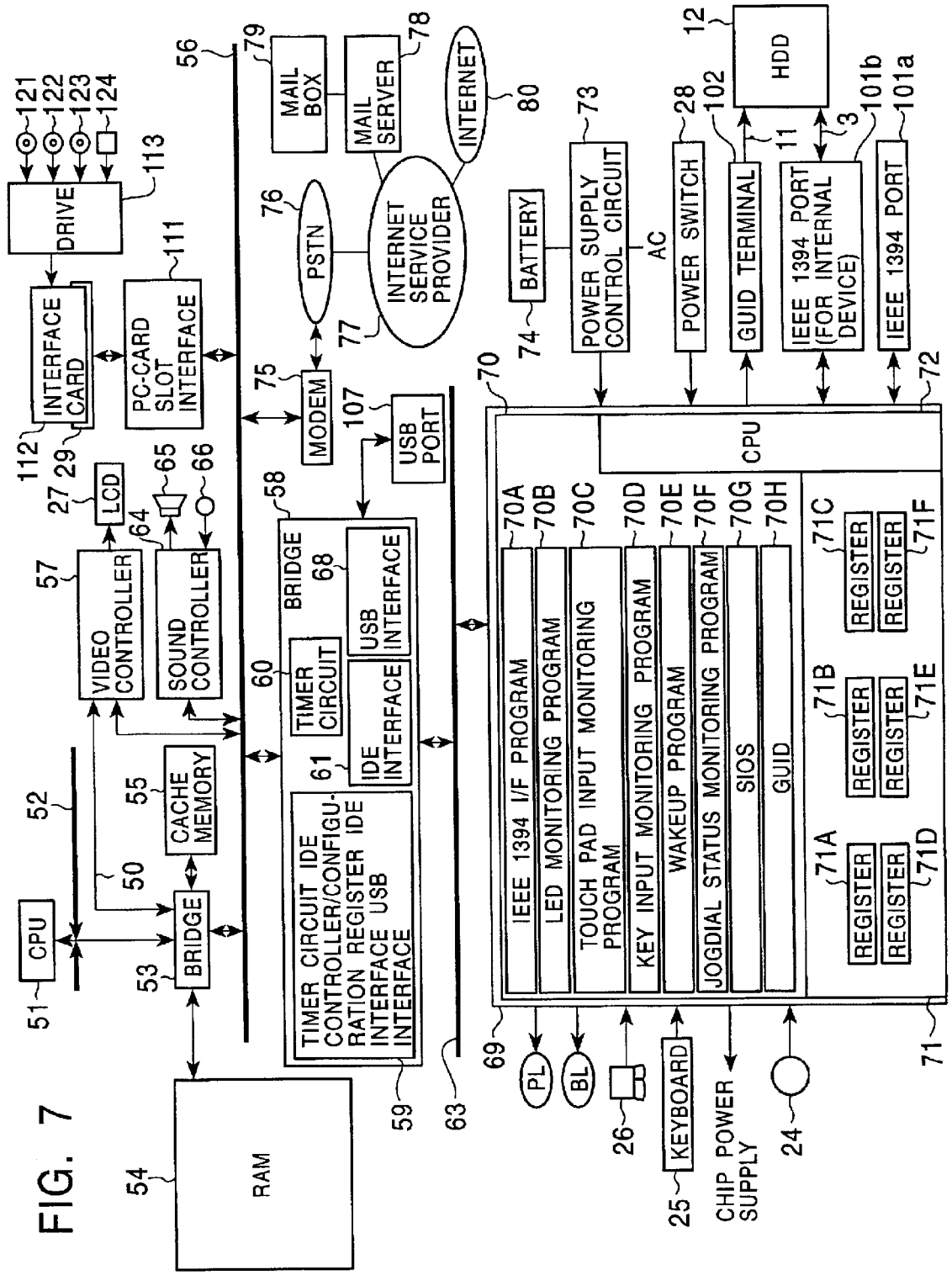
FIG. 7 is a block diagram showing the construction of the personal computer shown in FIG. 2.

FIG. 7 is a block diagram showing the electrical configuration of the personal computer 1.

A CPU (Central Processing Unit) 51 is implemented, for example, by a Pentium™ processor from Intel Corporation, and it is connected to a host but 52. The host bus 52 is further connected to a bridge 53, and the bridge 53 is also connected to an AGP (Accelerated Graphics Port) 50 and a PCI bus 56. The bridge 53 is implemented, for example, by a 400BX from Intel Corporation, and it controls the periphery of the CPU 51 and a RAM 54. Furthermore, the bridge 53 is connected to a video controller 57 via the AGP 50. The bridge 53 and a bridge 58 constitute a so-called chipset.

Furthermore, the bridge 53 is also connected to the RAM (Random Access Memory) 54 and a cache memory 55. The cache memory 55 caches data to be used by the CPU 51. Although not shown, the CPU 51 also includes a primary cache memory.

The RAM 54 is implemented, for example, by a DRAM (Dynamic Random Access Memory), and it stores programs to be executed by the CPU 51 and data necessary for the operation of the CPU 51.

The video controller 57 is connected to the PCI bus 56, and further connected to the bridge 53 via the AGP 50, and it controls display on the LCD 27 based on data supplied via the PCI bus 56 and the AGP 50.

The PCI bus 56 is connected to a sound controller 64, and it captures speech input from the microphone 66 and supplies a speech signal to a speaker 65. The PCI bus 56 is also connected to a modem 75 and a PC card slot interface 111.

The modem 75 can be connected to a communications network 80 such as the Internet, a mail server 78, etc. via the public switched telephone network 76 and an Internet service provider 77. In order to add an optional function, an interface card 112 is inserted as required into a slot 29 connected to the PC card slot interface 111, allowing data to be exchanged with an external apparatus. For example, the interface card 112 can be connected to a drive 113, allowing data to be exchanged with a magnetic disk 121, an optical disk 122, a magneto-optical disk 123, a semiconductor memory 124, etc. inserted into the drive 113.

Furthermore, the PCI bus 56 is also connected to the bridge 58. The bridge 58 is implemented, for example, by a PIIX4E from Intel Corporation, and it controls various inputs and outputs. More specifically, the bridge 58 includes an IDE (Integrated Drive Electronics) controller/configuration register 59, a timer circuit 60, an IDE interface 61, and a USB (Universal Serial Bus) interface 68, and it controls devices connected to a USB port 107 or connected via an ISA/EIO (Industry Standard Architecture/Extended Input Output) bus 63 and an I/O interface 69.

The IDE controller/configuration register 59 includes two IDE controllers, i.e., so-called a primary IDE controller and a secondary IDE controller, and a configuration register, etc.

The primary IDE controller and the secondary IDE controller can be connected to an external apparatus via an IDE bus (not shown).

The ISA/EIO bus 63 is further connected to the I/O interface 69. The I/O interface 69, a ROM 70, a RAM 71, and a CPU 72 are connected to each other.

In the ROM 70, for example, an IEEE 1394 I/F (Interface) program 70A, an LED control program 70B, a touch pad input monitoring program 70C, a key input monitoring program 70D, a wakeup program 70E, and a jog dial status monitoring program 70F are stored in advance.

The IEEE 1394 I/F program 70A executes input and output of data conforming to IEEE 1394 transmitted and received via the IEEE 1394 ports 101a and 101b. The IEEE 1394 I/F program 70A executes a process for acquiring an access right to the HDD 12 connected to the IEEE 1394 port 101b. The process for acquiring an access right will be described later.

The LED control program 70B controls the power lamp PL, the battery lamp BL, and as required, the message lamp ML, and other lamps implemented by LEDs. The touch pad input monitoring program 70C monitors input by the user using the touch pad 26. The key input monitoring program 70D monitors input by the user using the keyboard 25 or other key switches. The wakeup program 70E checks whether a preset time has been reached on the basis of the current time data supplied from the timer circuit 60 in the bridge 58, and if the preset time has been reached, it supplies power to each of the chips in order to activate a predetermined process (or program). The jog dial status monitoring program 70F constantly monitors rotation of a rotary encoder of the jog dial 24 and depression thereof.

Furthermore, in the ROM 70, BIOS (Basic Input/Output System) 70G is written. BIOS refers to a basic input/output system, and it is a software program for controlling input and output of data between an OS (Operating System) or application programs and peripheral devices (display, keyboard, HDD, etc.).

Furthermore, in the ROM 70, a GUID 70H is stored, which is read as required. The GUID 70H may be stored in a configuration ROM or a dedicated memory separately provided.

The RAM 71 includes registers for LED control, touch pad input status, key input status, and preset time, an I/O register for monitoring the jog dial status, an IEEE 1394 I/F register, etc. as registers 71A to 71F. For example, when the jog dial 24 is depressed, the LED control register turns on the message lamp ML, indicating an instantaneous activation of electronic mail. In the key input status register, when the jog dial 24 is depressed, an operation key flag is stored. In the preset time register, an arbitrary time can be set.

The I/O interface 69 is connected to each of the jog dial 24, the keyboard 25, and the touch pad 24 via connectors not shown, so that, when the user operates the jog dial 24, the touch pad 26, and the keyboard 25, it receives signals corresponding to the respective operations and outputs the signals to the ISA/EIO bus 63. Furthermore, the I/O interface exchanges data with an external apparatus via the IEEE 1394 ports 101a and 101b. Furthermore, the I/O interface 69 is connected to the power lamp PL, the battery lamp BL, the message lamp ML, and other lamps implemented by LEDs, and a power supply control circuit 73.

The power supply control circuit 73 is connected to an internal battery or an AC power supply, and it supplies power required to each of the blocks and recharges the internal battery 74 and secondary batteries of peripheral apparatuses. Furthermore, the CPU 72 monitors the power switch 28 which is operated when turning the power on or off.

The CPU 72 is allowed to constantly execute the IEEE 1394 I/F program 70A to the BIOS 70G by an internal power supply even when the power switch 28 is turned off. That is, the IEEE 1394 program 70A to the BIOS 70G are constantly in operation even when no window is opened on the LCD 27 of the display unit 23. Thus, the CPU 72 is constantly executing the jog dial status monitoring program 70E even when the power switch 28 is turned off and the OS has not been activated by the CPU 51, and the personal computer 1 has a programmable power key (PPK) function without any dedicated key provided therefore, allowing the user to activate desired software or script file just by depressing the jog dial 24 even when, for example, in a power-saving mode or when the power is turned off.

A GUID terminal 102 can be connected to a GUID terminal 202 (FIG. 8) provided on the HDD 12, and these are connected to form the GUID terminal connection unit 11. The GUID terminal 102, as well as the IEEE 1394 port 101b, is connected to the internal HDD 12, and it outputs the GUID stored in the GUID 70H to the HDD 12.

Figure 8:
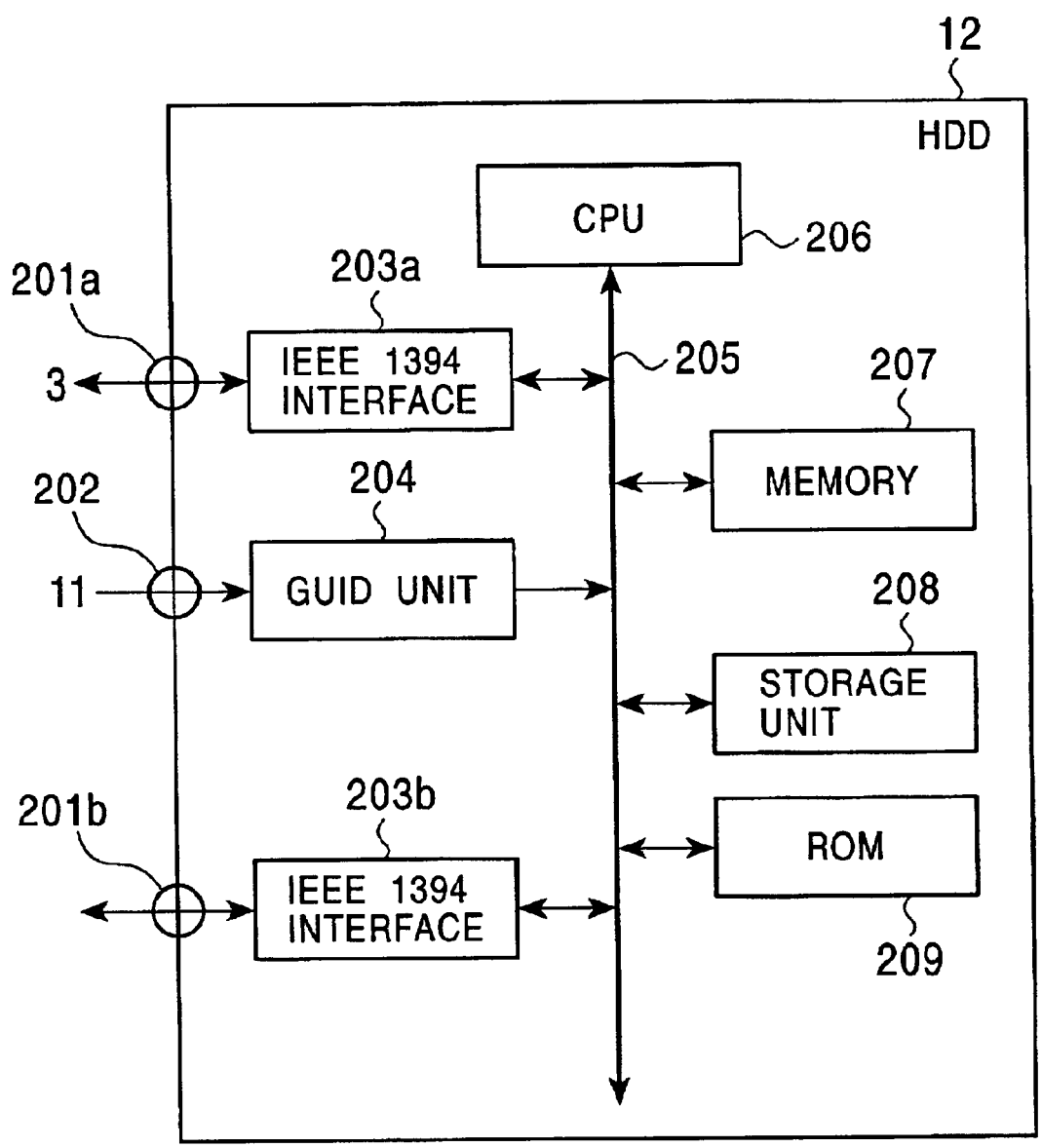
FIG. 8 is a block diagram of an HDD shown in FIG. 2.

Next, the construction of the HDD 12 will be described with reference to FIG. 8.

Figure 9:
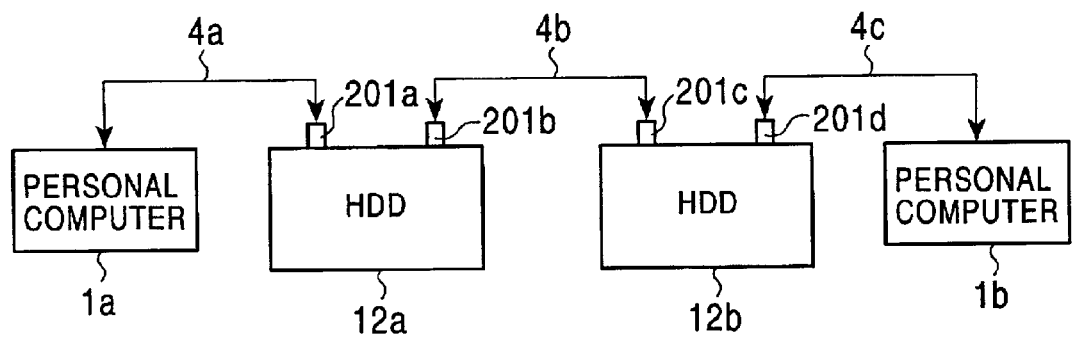
FIG. 9 is a diagram showing an example of the configuration of a network implemented by connecting a personal computer and an HDD in series.

An IEEE 1394 interface 203a is connected from the IEEE 1394 terminal 201a to the personal computer 1 via the IEEE 1394 connection unit 3, acting as an interface thereof. Furthermore, the HDD 12 is provided with an IEEE 1394 terminal 201b in addition to the IEEE 1394 terminal 201a. For example, as shown in FIG. 9, the personal computer 1a and the IEEE 1394 terminal 201a of an HDD 12a are connected via an IEEE 1394 cable 4a, the IEEE 1394 terminal 201b of the HDD 12a and an IEEE 1394 terminal 201c of an HDD 12b are connected via an IEEE 1394 cable 4b, and an IEEE 1394 terminal 201d of the HDD 12b and the personal computer 1b are connected via an IEEE 1394 cable 4c, forming a network in which two HDDs and two personal computers are connected in series based on IEEE 1394. It is to be understood that the types of devices to be connected and the respective numbers of the devices may be freely set without limitation to the example.

A GUID unit 204 is directly connected to the personal computer 1a from the GUID terminal 202 via the GUID connection unit 11 (connected separately from the IEEE 1394 connection), and it reads the GUID of the personal computer 1a. The GUID unit 204 will be described more in detail later with reference to FIG. 10. A CPU 206 controls the overall operation of the HDD 12, and it controls, as required, an IEEE 1394 interface 203, the GUID unit 204, a memory 207, and a storage unit 208 connected to a bus 205.

The memory 207 writes and reads information required for various processes to be executed by the CPU 206, and it stores information such as a password. The storage unit 208 including a hard disk is controlled by the CPU 206, and it stores various data to be processed by the personal computer 1a and also reads the data stored.

The ROM 209 stores the own GUID of the HDD 12.

Figure 10:
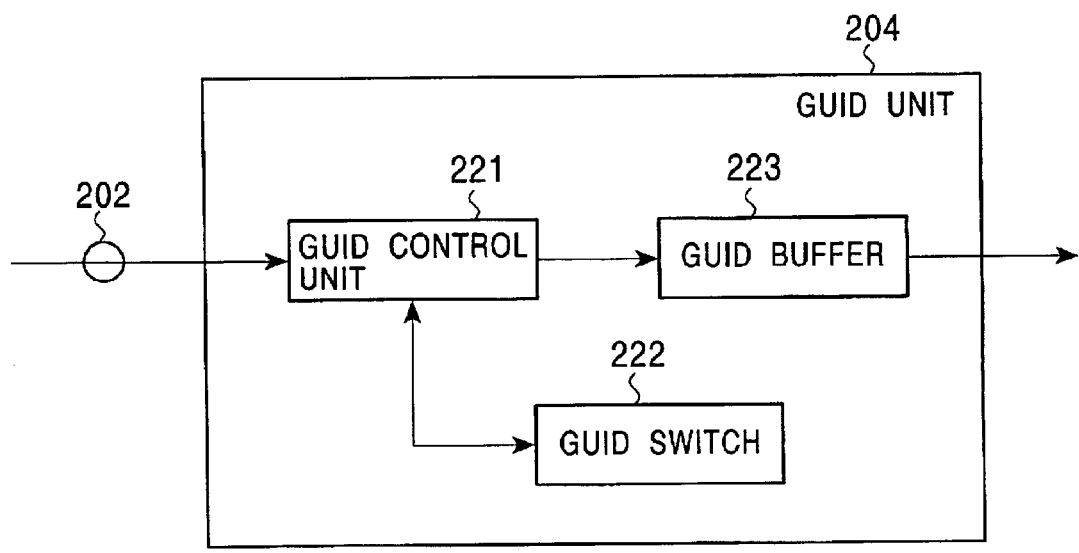
FIG. 10 is a block diagram showing the construction of a GUID unit.

Next, the GUID unit 204 will be described in detail with reference to FIG. 10.

A GUID control unit 221, in accordance with a control signal of a "0" (off signal) or a "1" (on signal) input from a GUID switch 222, outputs to a GUID buffer 223 at the downstream thereof data with all the bits "0" or the GUID of the personal computer 1a input from the personal computer 1a via the GUID terminal 202. Furthermore, the GUID control unit 221 detects whether the HDD 12 is incorporated in the personal computer 1a (i.e., whether the GUID terminal 202 is connected to the GUID terminal 102 of the personal computer 1a), and if the GUID terminal 202 is not connected, it disregards a signal which is output from the GUID switch 222 by default and outputs data with all the bits "0" to the GUID buffer 223, where the data is stored.

The GUID switch 222 controls the GUID control unit 221 as described above. When the GUID switch 222 detects that the HDD 12 is mounted on the personal computer 1a, it outputs a "1" to the GUID control unit 221, while it outputs a "0" when the HDD 12 is not mounted. The GUID switch 222 can also be operated manually by the user.

Figure 11:
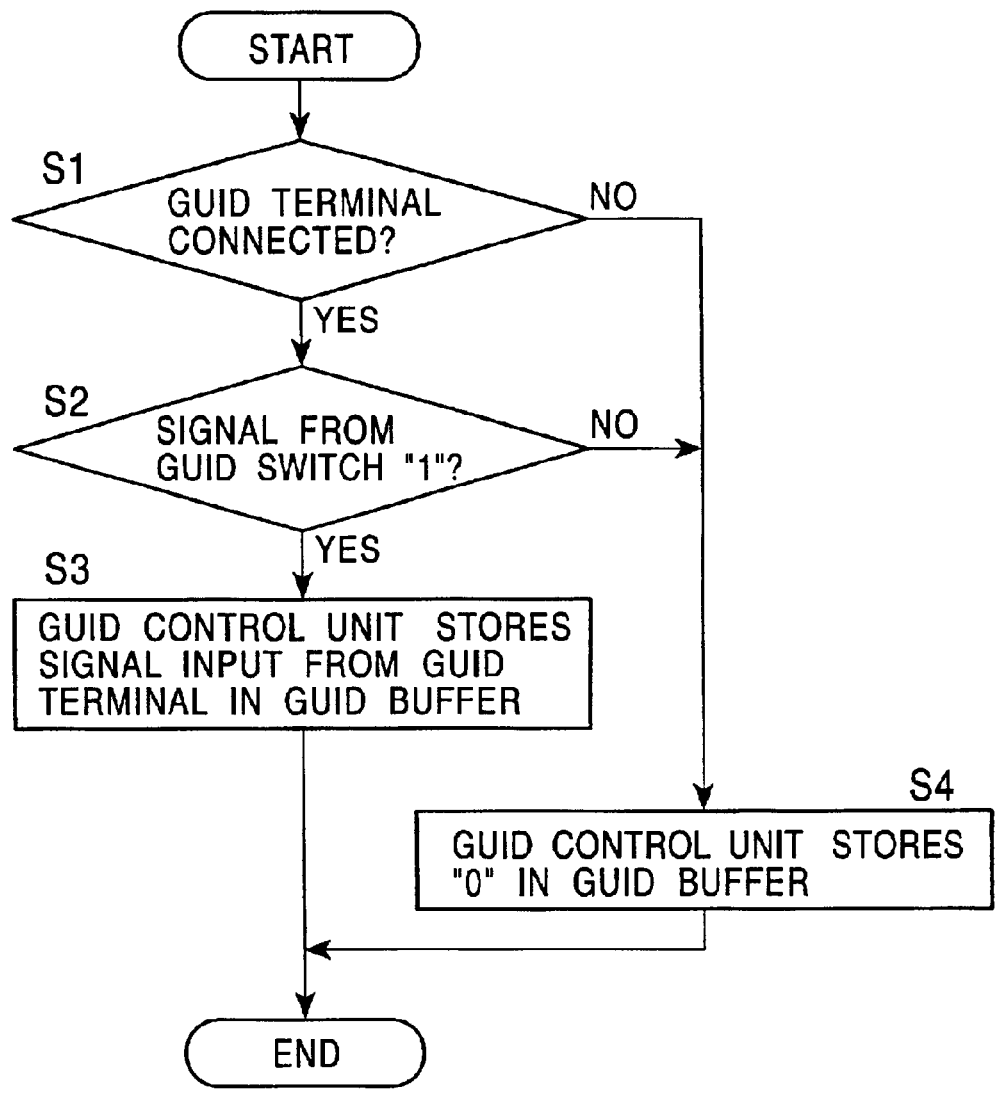
FIG. 11 is a flowchart for explaining the operation of the GUID unit.

Now, the operation of the GUID unit 204 will be described with reference to a flowchart shown in FIG. 11.

In step S1, the GUID control unit 221 determines whether the GUID terminal 202 is connected to the GUID terminal 102 of the personal computer 1a, and if a connection is detected, the processing proceeds to step S2.

In step S2, the GUID control unit 221 determines whether the signal from the GUID switch 222 is a "1" (on signal). If the signal from the GUID switch 222 is determined as a "1", in step S3, the GUID control unit 221 outputs the GUID input from the GUID terminal 202 (the GUID of the personal computer 1a) to the GUID buffer 203, where the GUID is stored.

If it is determined in step S1 that the GUID terminal 202 is not connected, i.e., the HDD 12 is not incorporated in the personal computer 1a, in step S4, the GUID control unit 221 outputs data with all the bits "0" to the GUID buffer 223.

Also, if it is determined in step S2 that the signal from the GUID switch 222 is not a "1", i.e., if the signal is determined as a "0" (off signal), the process of step S4 is executed.

As described above, in accordance with the switching of the GUID switch 222, and the connection status of the GUID terminal 202, the GUID unit 204 stores the GUID of the personal computer 1a in the GUID buffer 223 when a "1" (on signal) is input thereto, while storing data with all the bits "0" in the GUID buffer 223 when a "0" (off signal) is input thereto.

That is, the CPU 72 of the personal computer 1a detects whether the HDD 12 is connected to the GUID terminal 102, and if a connection is detected, the CPU 72 reads the GUID 70H stored in the ROM 70 and stores it in the HDD 12.

Next, with reference to a flowchart shown in FIG. 12, the operations of the personal computer 1 and the HDD 12 for the personal computer 1 to acquire an access right to the HDD 12 when the GUID switch 222 of the GUID unit 204 is set so as to output a "0" (turned off) will be described. In this case, in response to a "0" output from the GUID switch 222, data with all the bits "0" has been stored in the GUID buffer 223 by the GUID control unit 221.

In step S11, for example, the personal computer 1a activates the IEEE 1394 I/F program 70A to issue a command called a login request (login ORB: login Operation Request Block), which is a request for acquiring an access right, and outputs it to the HDD 12 via the IEEE 1394 connection unit 3.

Now, login ORB will be described. Login ORB is a type of ORB (Operation Request Block) which is a command defined in SBP-2. An ORB is issued by an initiator and output to a target. The target executes a predetermined process according to the ORB, and upon completion thereof, it writes information regarding the process at a predetermined position of the ORB received and returns it to the initiator.

Figure 13:
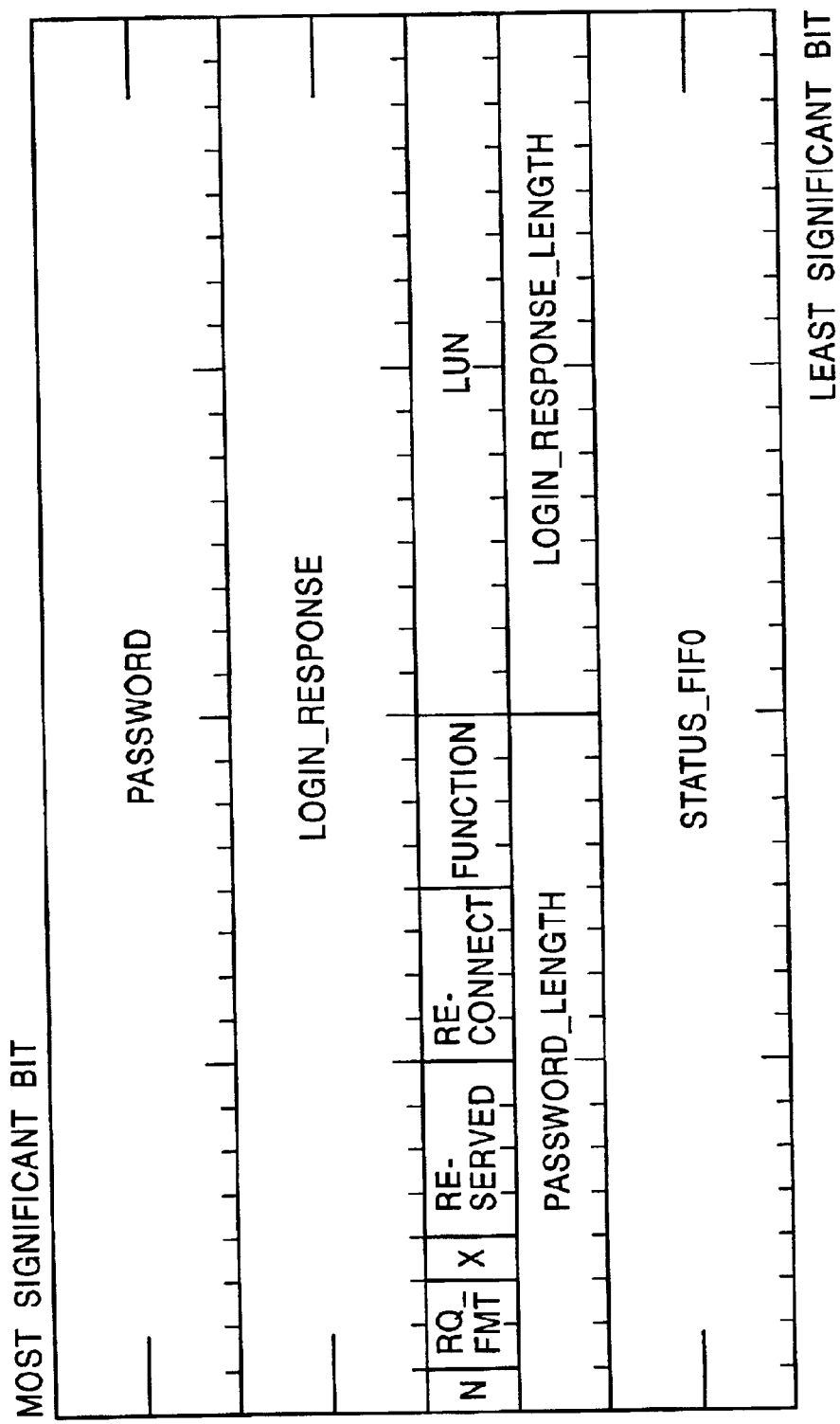
FIG. 13 is a diagram showing the format of a login ORB.

FIG. 13 shows the format of login ORB. In the figure, each column represents a bit of data, and each row represents 32 bits. Furthermore, in the figure, the bit at the leftmost position on the uppermost row represents the most significant bit, and the bit at the rightmost position on the lowermost row represents the least significant bit. When a row is not specifically divided, it is intended that the data area is variable.

At the positions indicated as "password" and "password_length", the password data registered in the device which is to acquire an access right (the HDD 12 in this case) and the data length thereof are stored. The password is optional, and may be omitted if use of a password is not specified.

At the positions indicated as "login_response" and "login_response_length", when the HDD 12 assigns an access right to the login ORB, the HDD 12 writes data indicating the assignment of an access right and data representing the data length thereof. The "login_response" field will be described later with reference to FIG. 14. At the positions indicated as "n" (notify), "rq_fmt" (request format), and "function", on the row below "login_response", data specifying the type of the ORB is stored. Thus, in this case, data indicating login ORB is stored therein.

At the position indicated as "x" (exclusive), data indicating whether the login ORB is for a plurality of initiators or only for the initiator which has issued the login ORB is stored. The position indicated as "reserved" is provided for future extension of commands. At the position indicated as "reconnect", data indicating the time required for a reconnection is stored. At the position indicated as "lun" (logical unit number), data specifying the destination device of the login ORB (the HDD 12 in this case) is stored. At the position indicated as "status FIFO", the HDD 12 writes a status block (FIG. 15) upon completion of the execution of the command.

Figure 12:
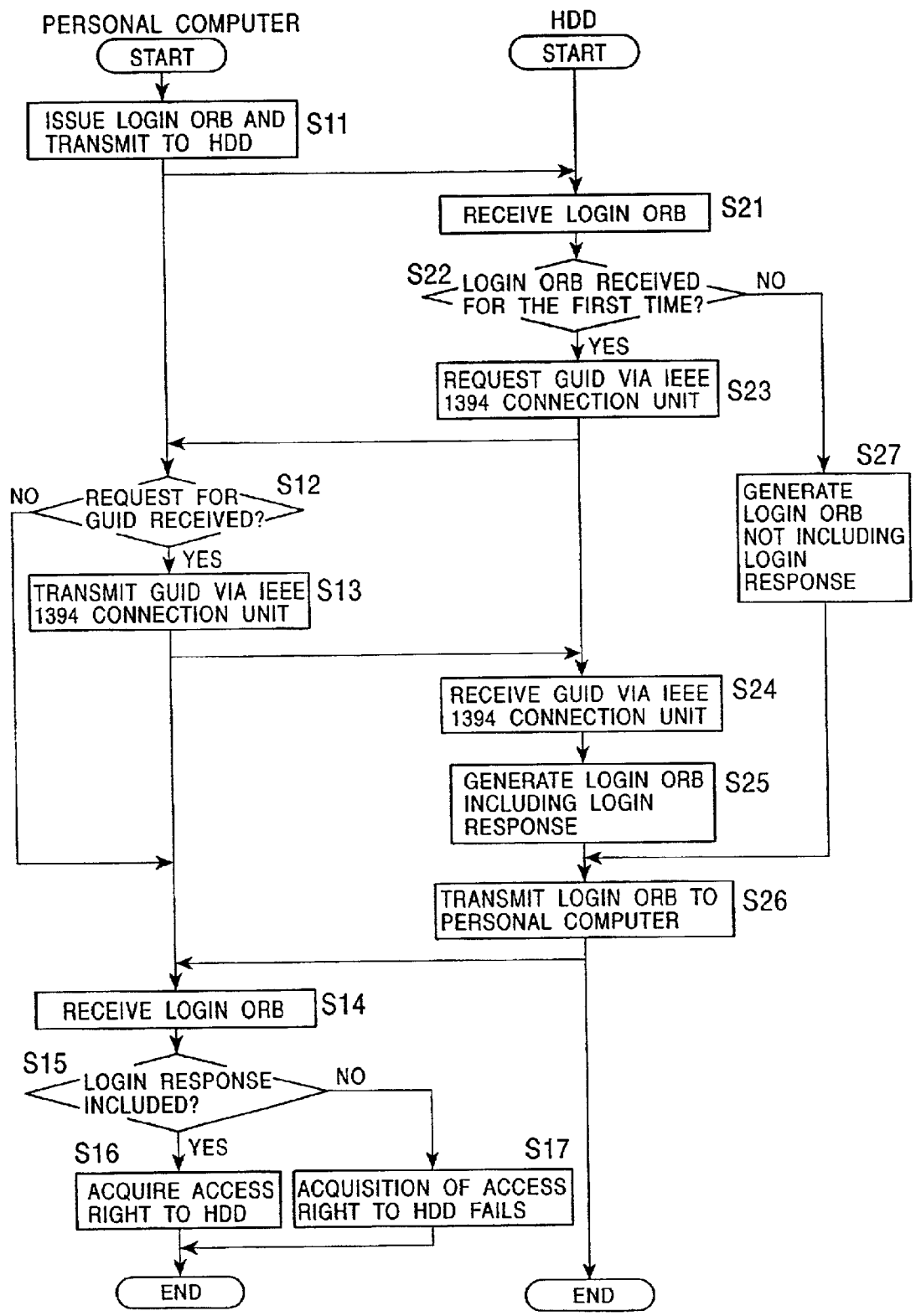
FIG. 12 is a flowchart for explaining the processing in the personal computer and the HDD for acquiring an access right.

Now, the description returns to the flowchart shown in FIG. 12.

When a login request is output from the personal computer 1a, in step S21, the CPU 206 of the HDD 12 receives the login request (login ORB) via the IEEE 1394 connection unit 3 and the IEEE 1394 interface 203a, and stores the login ORB in the memory 207. In step S22, the CPU 206 determines whether login ORB is received for the first time, and if login ORB is received for the first time, the processing proceeds to step S23.

In step S23, the CPU 206 records the reception of login ORB in the memory 207, and requests the GUID to the personal computer 1a via the IEEE 1394 interface 203a and the IEEE 1394 connection unit 3.

In step S12, the CPU 72 of the personal computer 1a determines whether the GUID has been requested from the HDD 12. In this case, since the GUID has been requested from the HDD 12, in step S13, the CPU 72 reads the GUID 70H stored in the ROM 70, and transmits it to the HDD 12 via the IEEE 1394 connection unit 3.

In step S24, the CPU 206 of the HDD 12 receives the GUID of the personal computer 1a via the IEEE 1394 interface 203a and stores it in the memory 207.

In step S25, the CPU 206 reads the login ORB stored in the memory 207, and writes thereto "login_response" including data indicating permission of an access right, and "status_FIFO", generating a login ORB to be returned to the personal computer 1a.

Figure 14:
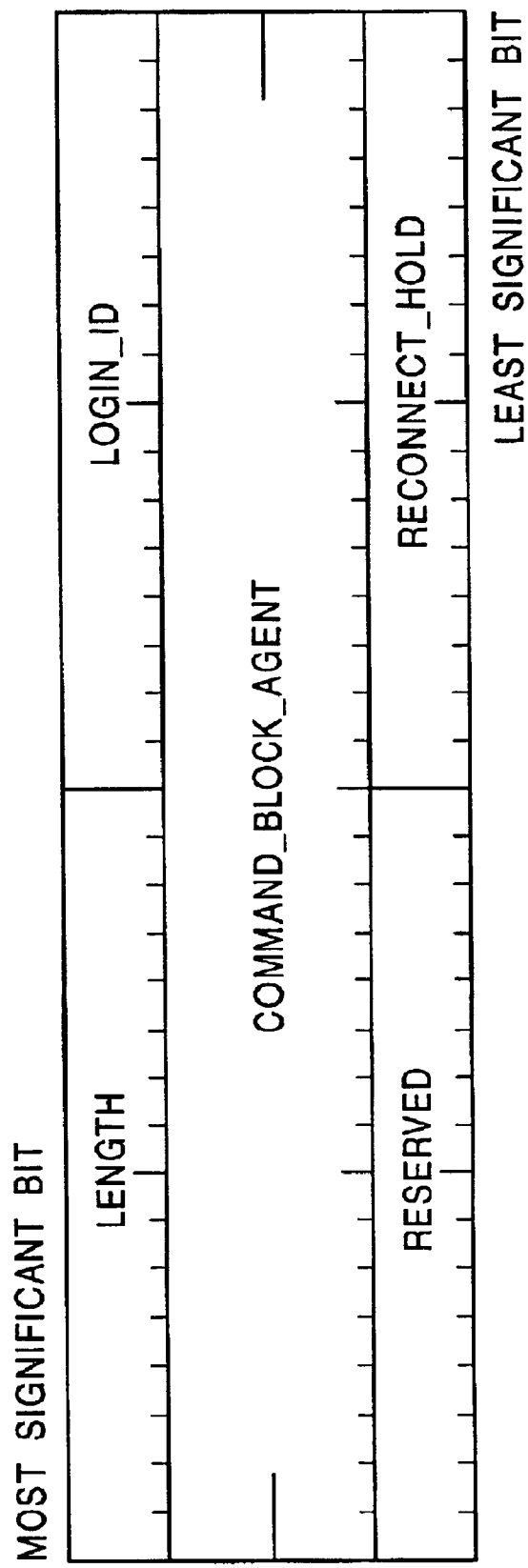
FIG. 14 is a diagram showing the format of a login_ response.

Now, "login_response" will be described with reference to FIG. 14. At the position indicated as "length" on the uppermost row of the login_response field, data indicating the data length of the login_response is stored. At the position indicated as "login_ID", data identifying an initiator for which access is permitted is stored. At the position indicated as "command block agent", data indicating the address of CSR (Control and State Register) for executing various operations is stored. The position indicated as "reserved" is provided for future extension of commands similarly to login ORB described earlier. At the position indicated as "reconnect_hold", data indicating the time for a target to reserve resources for an operation to be initiated by the initiator for which access is permitted is stored.

Figure 15:
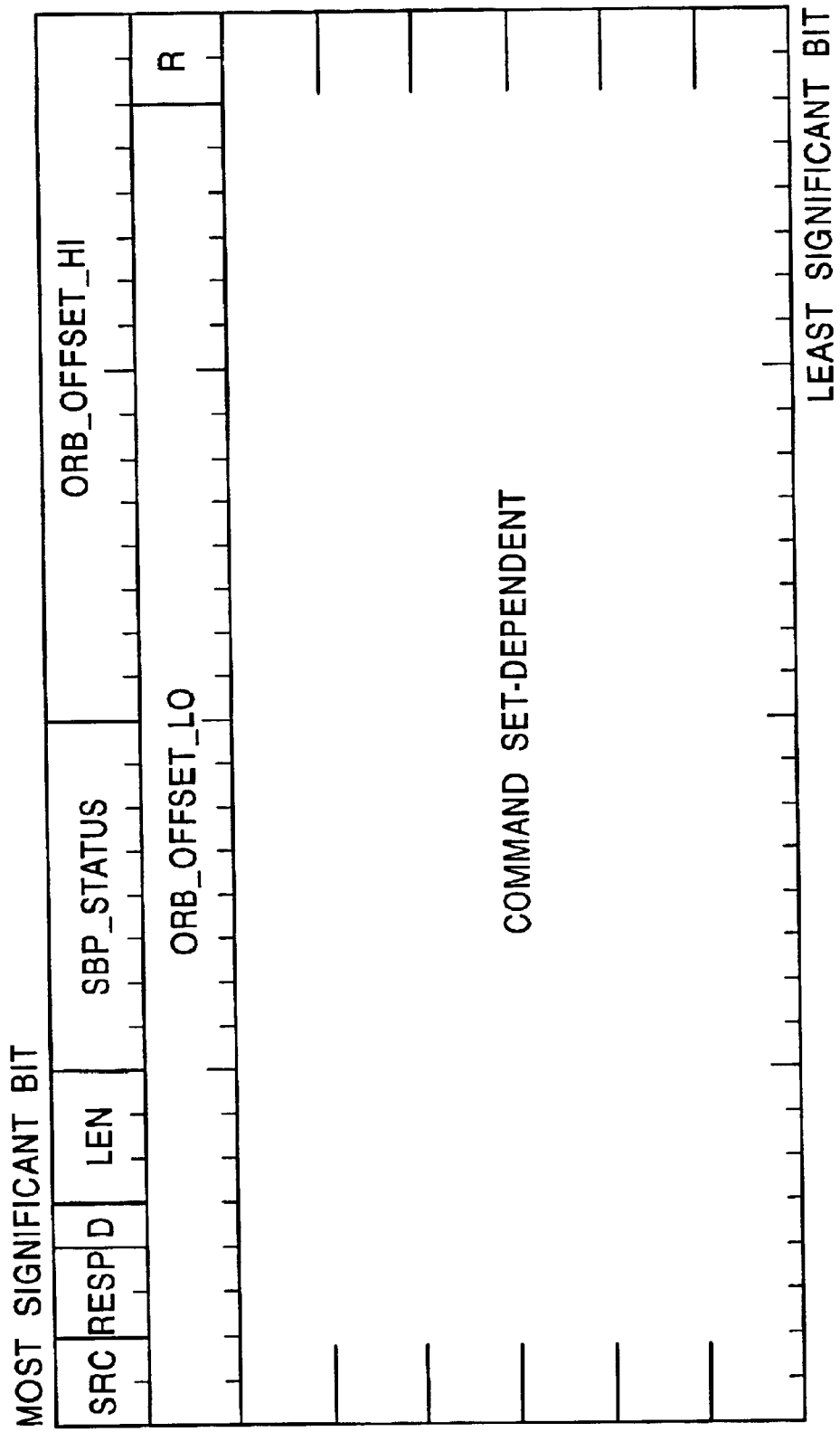
FIG. 15 is a diagram showing the format of a status_ block.

Next, a status_block to be written to the status_FIFO" will be described with reference to FIG. 15. At the position indicated as "src", data identifying the type of the ORB is stored. That is, in this case, data indicating login ORB is stored. At the position indicated as "resp", data identifying the type of response is stored. At the position indicated as "d", data indicating whether the current state of the target allows reception of a command.

At the position indicated as "len", data indicating the number of valid status_blocks stored in the status_FIFO is stored. At the position indicated as "sbp_status", additional data associated with the information stored in "resp" is stored. The positions indicated as "ORB_offset_hi", "ORB_offset_lo", and "r" are used to specify various address spaces. At the position indicated as "command set-dependent", various data is stored for each command.

Now, the description returns to the flowchart shown in FIG. 12.

In step S26, the CPU 206 outputs the login ORB which has been generated to the personal computer 1a via the IEEE 1394 interface 203a and the IEEE 1394 connection unit 3.

In response thereto, in step S14, the CPU 72 of the personal computer 1a receives the login ORB input from the HDD 12 via the IEEE 1394 connection unit 3. In step S15, the CPU 72 determines whether a login response is included in the login ORB which has been received. In this case, since a login_response is included in the login ORB which has been received, in step S16, the CPU 72 recognizes an acquisition of an access right to the HDD 12.

In step S22, if it is determined that login ORB is received not for the first time, that is, for example, when the personal computer 1b has already issued a request for acquiring an access right, in step S27, the CPU 206 reads the login ORB stored in the memory 207, and writes only a status block in the "status_FIFO" of the login ORB, generating a login ORB to be returned in which a login_response is not included.

An this time, with regard to the processes by the personal computer 1a, in step S12, it is determined that the GUID is not requested, the process of step S13 is skipped. Furthermore, in step S14, since a login ORB which does not include a login_response is received, in step S15, it is determined that a login_response is not included, and in step S17, the CPU 72 recognizes that an acquisition of an access right to the HDD 12 has failed.

That is, if the personal computer 1b, which has issued a request for acquiring an access right earlier, has already acquired an access right, the personal computer 1a, which has issued a request for an access right later, is not allowed to acquire an access right.

As described above, when the GUID switch 222 is set so as to output a "0", the GUID control unit 221 constantly outputs data with all the bits "0" to the GUID buffer 223, the GUID unit 204 thus being substantially absent. Thus, the processing according to the flowchart shown in FIG. 12 becomes similar to the case of a race condition in the conventional art, assigning an access right to the personal computer 1 which has requested an access right first. The processing is also similar in the case where the GUID terminal 202 is not connected (the GUID terminal 102 or the GUID terminal 202 is not present).

Figure 16:
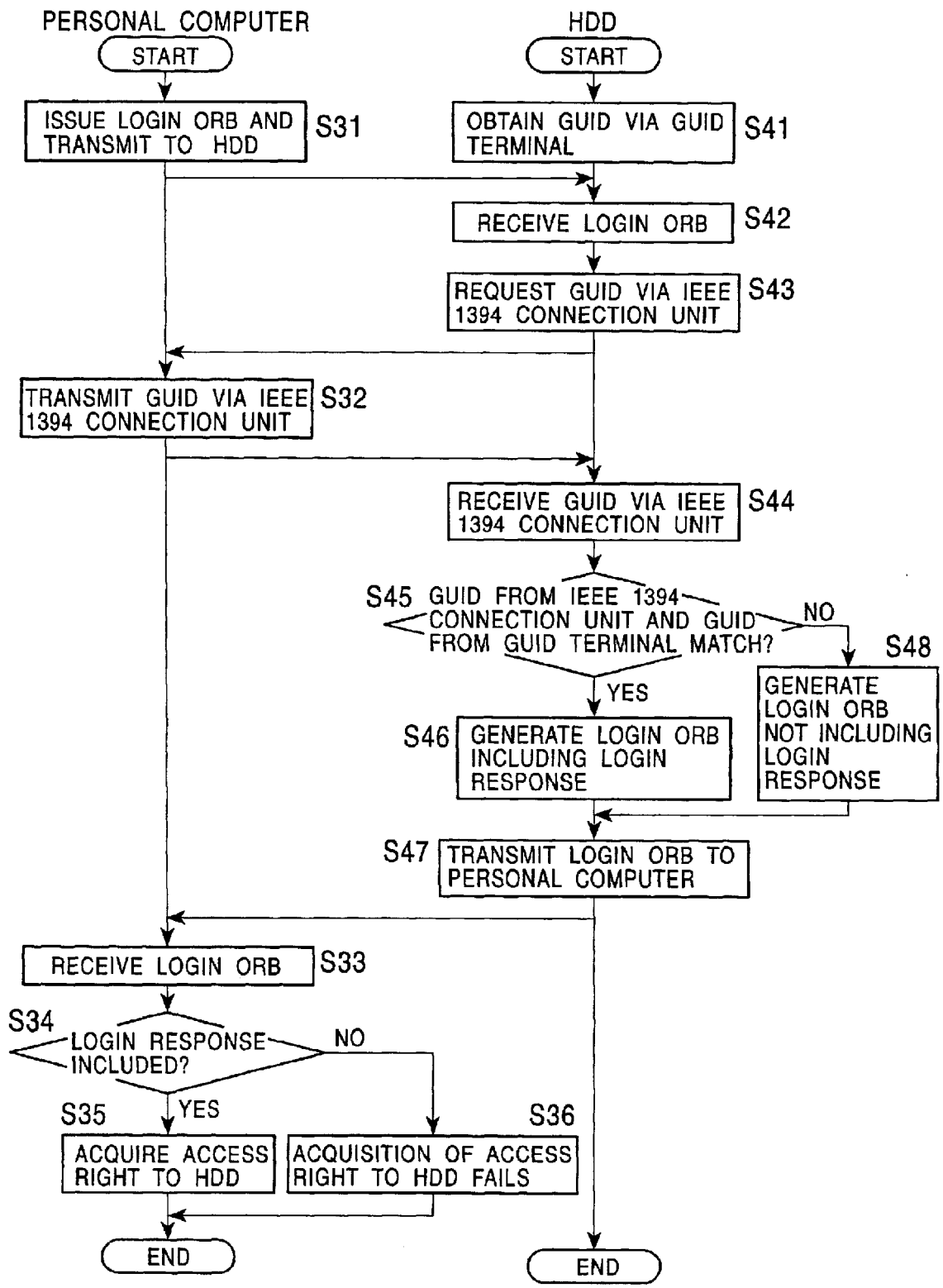
FIG. 16 is a flowchart for explaining the processing in the personal computer and the HDD for acquiring an access right.

Next, with reference to a flowchart shown in FIG. 16, the operations of the personal computer 1 and the HDD 12 when the GUID switch 222 of the GUID unit 204 are set so as to output a "1" (turned on) will be described.

In step S31, for example, the CPU 72 of the personal computer 1a activates the IEEE 1394 I/F program 70A to issue a login ORB, and outputs it to the HDD 12 via the IEEE 1394 connection unit 3.

Furthermore, because the GUID switch 222 of the GUID unit 204 is set so as to output a "1" in the HDD 12, at the time when a connection is made to the personal computer 1a, that is, at the time when the GUID terminal 202 is connected to the GUID terminal 102 of the personal computer 1a and the GUID terminal connection unit 11 is formed, in step S41, the GUID control unit 221 obtains the GUID of the personal computer 1a output from the GUID terminal 102 via the GUID terminal 202, and outputs the GUID data to the GUID buffer 223, where the GUID data is stored. Then, the CPU 206 executes the processes of steps S42 to S48 shown in FIG. 16 instead of the processes of steps S21 to S27 shown in FIG. 12.

In step S42, the CPU 206 of the HDD 12 receives the login ORB via the IEEE 1394 connection unit 3 and the IEEE 1394 interface 203a, and stores the login ORB in the memory 207.

In step S43, the CPU 206 requests transmission of the GUID to the personal computer 1a via the IEEE 1394 interface 203a and the IEEE 1394 connection unit 3.

In step S13, the CPU 72 of the personal computer 1a reads the GUID 70H stored in the ROM 70, and transmits the GUID to the HDD 12 via the IEEE 1394 connection unit 3.

In step S44, the CPU 206 of the HDD 12 receives the GUID of the personal computer 1a via the IEEE 1394 interface 203a, and stores it in the memory 207.

In step S45, the CPU 206 of the HDD 12 compares the GUID stored in the memory 207 with the GUID stored in the GUID buffer 223 of the GUID unit 204, and determines whether the GUIDs match. In this case, since the GUIDs are for the same personal computer 1a, it is determined that the GUIDs match, and the processing proceeds to step S46.

In step S46, the CPU 206 reads the login ORB stored in the memory 207, and writes thereto "login_response" including data indicating permission of an access right and "status_FIFO" indicating status, generating a login ORB to be returned to the personal computer 1a.

In step S47, the CPU 206 outputs the login ORB which has been generated to the personal computer 1a via the IEEE 1394 interface 203a and the IEEE 1394 connection unit 3.

In step S33, the CPU 72 of the personal computer 1a receives the login ORB input from the HDD 12 via the IEEE 1394 connection unit 3. The CPU 72 determines whether a login_response is included in the login ORB which has been received. In this case, since a login_response is included in the login ORB which has been received, in step S35, the CPU 72 recognizes an acquisition of an access right to the HDD 12.

In step S45, for example, if an access right has been requested by the personal computer 1b, since the GUID stored in the GUID buffer 223 is that of the personal computer 1a and does not coincide with the GUID of the personal computer 1b stored in the memory 207, it is determined that the GUIDs do not match, and the processing proceeds to step S48.

In step S48, the CPU 206 reads the login ORB stored in the memory 207, and writes only a status block in the "status_FIFO" of the login ORB, generating a login ORB to be returned in which a login_response is not included.

As a result, in step S33, the personal computer 1b receives the login ORB which does not include a login_response, and in step S34, it is determined that a login_response is not included, and in step S36, the CPU 72 recognizes that an acquisition of an access right to the HDD 12 has failed.

As described above, when the GUID switch 222 of the GUID unit 204 is set so as to output a "1", only the personal computer 1a in which the HDD 12 is incorporated (the personal computer 1a connected to the GUID terminal 202 of the HDD 12) is allowed to acquire an access right to the HDD 12.

Figure 17:
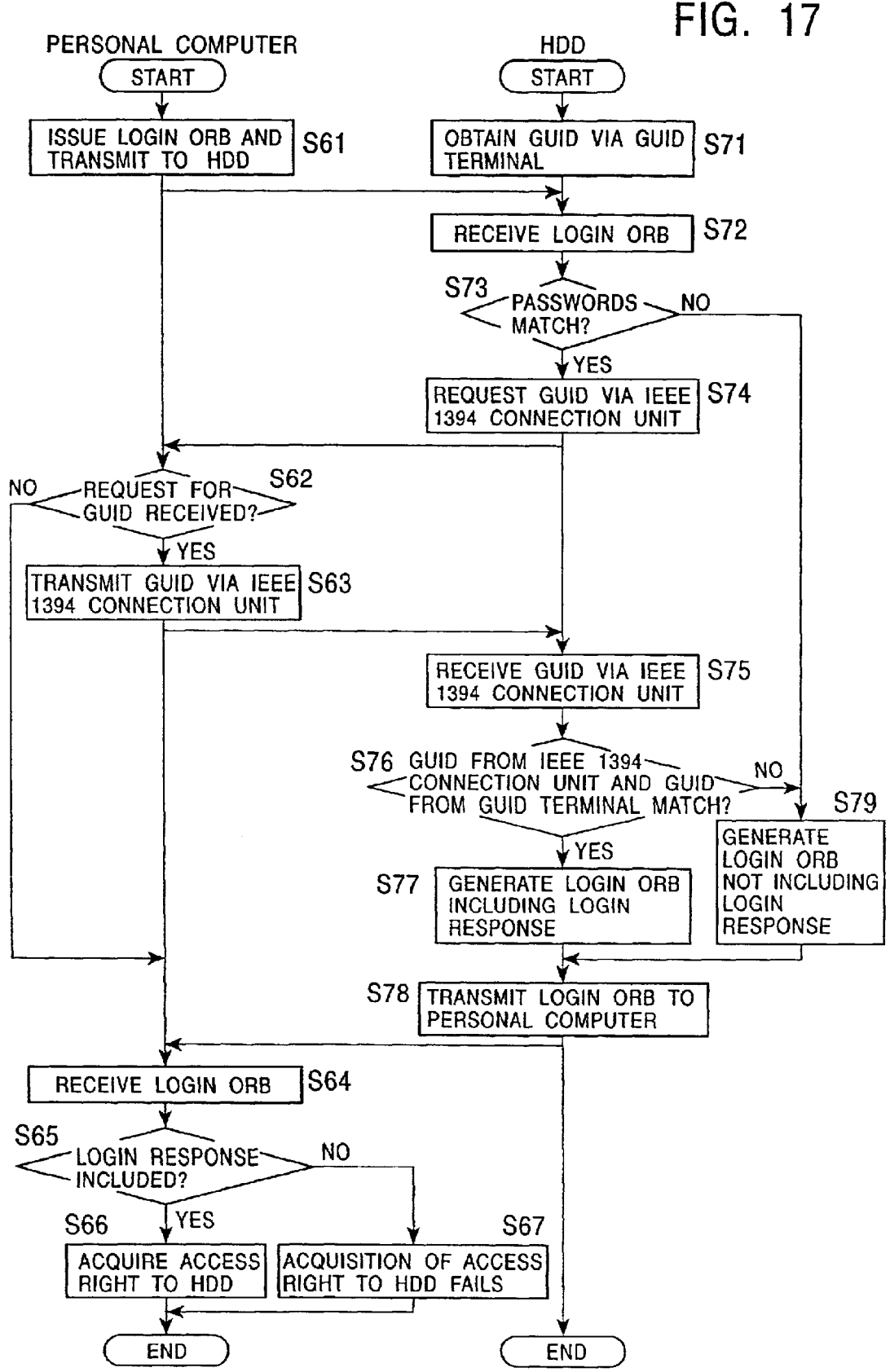
FIG. 17 is a flowchart for explaining the processing in the personal computer and the HDD for acquiring an access right.

Next, with reference to a flowchart shown in FIG. 17, the operations of the personal computer 1 and the HDD 12 when the GUID switch 222 of the GUID unit 204 is set so as to output a "1" and the personal computer 1 acquires an access right to the HDD 12 using the password function of login ORB, mentioned earlier, will be described.

In step S61, for example, the CPU 72 of the personal computer 1a activates the IEEE 1394 I/F program 70A to issue a login ORB including a password, and outputs it to the HDD 12 via the IEEE 1394 connection unit 3. The password included in the login ORB is set, for example, by the user in advance.

Furthermore, since the GUID switch 222 of the GUID unit 204 is set so as to output a "1", when a connection is made to the personal computer 1a, in step S71, the GUID control unit 221 of the HDD 12 obtains the GUID of the personal computer 1a output from the GUID terminal 102 via the GUID terminal 202, and outputs the GUID data to the GUID 223, where the GUID data is stored.

In step S72, the CPU 206 of the HDD 12 receives the login ORB via the IEEE 1394 connection unit 3 and the IEEE 1394 interface 203a, and stores the login ORB in the memory 207.

In step S73, the CPU 206 determines whether the password included in the login ORB which has been received coincides with the password stored in advance in the memory 207. For example, when a correct password has been transmitted, that is, when the password included in the login ORB which has been received coincides with the password stored in advance in the memory 207, the processing proceeds to step S74.

In step S74, the CPU 206 requests the GUID to the personal computer 1a via the IEEE 1394 interface 203a and the IEEE 1394 connection unit 3.

Then, in step S62, the CPU 72 of the personal computer 1a determines whether the GUID has been requested from the HDD 12. In this case, since the GUID has been requested from the HDD 12, in step S63, the CPU 72 reads the GUID 70H stored in the ROM 70, and transmits it to the HDD 12 via the IEEE 1394 connection unit 3.

In step S75, the CPU 206 of the HDD 12 receives the GUID of the personal computer 1a via the IEEE 1394 interface 203a, and stores it in the memory 207.

In step S76, the CPU 206 of the HDD 12 compares the GUID stored in the memory 207 with the GUID stored in the GUID buffer 223 of the GUID unit 204, and determines whether the GUIDs match. In this case, since the GUIDs are for the same personal computer 1a, it is determined that the GUIDs match, and the processing proceeds to step S77.

In step S77, the CPU 206 reads the login ORB stored in the memory 207, and writes thereto "login_response" including data indicating permission of an access right, and "status_FIFO", generating a login ORB to be returned to the personal computer 1a.

In step S78, the CPU 206 outputs the login ORB which has been generated to the personal computer 1a via the IEEE 1394 interface 203a and the IEEE 1394 connection unit 3.

In step S64, the CPU 72 of the personal computer 1a receives the login ORB input from the HDD 12 via the IEEE 1394 connection unit 3. In step S65, the CPU 72 determines whether a login_response is included in the login ORB which has been received. In this case, since a login response is included in the login ORB which has been received, in step S66, the CPU 72 recognizes an acquisition of an access right to the HDD 12.

If it is determined in step S73 that the passwords do not match, in step S79, the CPU 206 reads the login ORB stored in the memory 207, and writes only a status block in the "status_FIFO" of the login ORB, generating a login ORB to be returned in which a login_response is not included.

Furthermore, at this time, since it is determined in step S62 that a request for GUID from the HDD 12 has not been received, the CPU 72 of the personal computer 1a skips the process of step S63. Thus, since the login ORB not including a login_response is received in step S64, it is determined in step S65 that a login_response is not included, and in step S67, the CPU 72 recognizes that an acquisition of an access right to the HDD 12 has failed.

Furthermore, in step S76, for example, if the personal computer 1b has requested an access right, even if a correct password is entered, since the GUID stored in the GUID buffer 223 is that of the personal computer 1a, not coinciding with the GUID of the personal computer 1b stored in the memory 207, it is determined that the GUIDs do not match, and the processing proceeds to step S79, and the subsequent processes are repeated.

As described above, when the GUID switch 222 of the GUID unit 204 is set so as to output a "1", only the personal computer 1a in which the HDD 12 is incorporated is allowed to acquire an access right to the HDD 12, and also is allowed to maintain compatibility with the password function included in the SBP-2 standard.

Although the description has been made hereinabove using an HDD as a device conforming to the SBP-2 standard, for example, instead of the HDD, various storage devices conforming to SBP-2 standard, such as a CD-R/RW (Compact Disk Recordable/Rewritable), a CD-ROM (Compact Disk Read-Only Memory), a DVD-ROM (Digital Versatile Disk Read-Only Memory), a DVD-RAM (Digital Versatile Disk Random Access Memory), a Zip (storage device), and an MD (Mini-Disk) may be used.

In accordance with the above, in a network implemented based on IEEE 1394 and conforming to the SBP-2 standard, a predetermined information processing apparatus (initiator) is allowed to acquire an access right to a device (target) incorporated therein.

The series of processes described above may be executed either in hardware or in software. When the series of processes are executed in software, a program implementing the software is installed from a program storage medium to a computer embedded in specific hardware, a general-purpose personal computer which is capable of executing various functions with a variety of programs installed thereon, etc.

The program storage medium is a package media on which the program is stored, distributed separately from the personal computer in order to provide the user with the program, such as a magnetic disk 121 (including a floppy disk), an optical disk 122 (including a CD-ROM (Compact Disk Read-Only Memory) and a DVD (Digital Versatile Disk), a magneto-optical disk 123 (including an MD (Mini-Disk)), and a semiconductor memory 124 (including a Memory Stick).

In this specification, the steps of the program to be stored on the program storage medium need not necessarily be executed sequentially in the described order, and may be executed concurrently or individually.

In this specification, a system refers to the entirety of a plurality of apparatuses.

What is claimed is:

1. An information processing apparatus incorporated in a control unit, said control unit being connected to one of a plurality of other control units via a bus and accessed by one of said plurality of other control units that acquired a first access right, said information processing apparatus comprising:

setting means for setting a mode for acquiring an access right;

storing means for storing authentication information given at a time of production of the control unit incorporating the information processing apparatus;

command receiving means for receiving a command to request the access right transmitted from the control unit;

first executing means for executing:
  (i) a request process for requesting the authentication information of the control unit and transmitting the command to request the access right when a first mode is set by the setting means;
  (ii) a receiving process for receiving the authentication information transmitted by the request process; and
  (iii) a reply process for sending a reply command of acquiring the access right when the authentication information received by the receiving process and the authentication information stored by storing means match; and second executing means for executing:
(i) the reply process for sending the reply command of acquiring the access right and transmitting the command to request the access right when a second mode is set by the setting means.

2. The information processing apparatus according to claim 1, further comprising detecting means for detecting a connection to the one of said plurality of other control units,
wherein said setting means sets said first mode when said detecting means detects a connection to the one of said plurality of other control units while said setting means sets said second mode when said detecting means detects no connection to the one of said plurality of other control units.

3. The information processing apparatus according to claim 1, further comprising:
obtaining means for obtaining the authentication information from the one of said plurality of other control units via said bus;
comparing means for comparing the authentication information obtained by said obtaining means with authentication information held in said storing means; and
output means for outputting a signal which permits control of said information processing apparatus to the one of said plurality of other control units via said bus based on a result of the comparison by said comparing means.

4. The information processing apparatus according to claim 1, wherein said setting means allows setting of the mode by a manual operation.

5. The information processing apparatus according to claim 1, wherein said bus is an IEEE 1394 high-speed serial bus and said authentication information is a Global Unique Identifier (GUID).

6. An information processing method for an information processing apparatus incorporated in a control unit, said control unit being connected to one of a plurality of other control units via a bus and accessed by one of said plurality of other control units that acquired a first access right, said information processing method comprising the steps of:
setting a mode for acquiring an access right;
storing authentication information given at a time of production of the control unit incorporating the information processing apparatus;
receiving a command to request the access right transmitted from the control unit;
executing via a first executing means:
(i) a request process for requesting the authentication information of the control unit and transmitting the command to request the access right when a first mode is set by the setting step;
(ii) a receiving process for receiving the authentication information transmitted by the request process; and
(iii) a reply process for sending a reply command of acquiring the access right when the authentication information received by the receiving process and the authentication information stored by storing step match; and
executing via a second executing means:
(i) the reply process for sending the reply command of acquiring the access right and transmitting the command to request the access right when a second mode is set by the setting step.

7. A program storage medium storing a computer-readable program for controlling an information processing apparatus incorporated in a control unit, said control unit being connected to one of a plurality of other control units via a bus and accessed by one of said plurality of other control units that acquired a first access right, said program comprising the steps of:
setting a mode for acquiring an access right;
storing authentication information given at a time of production of the control unit incorporating the information processing apparatus;
receiving a command to request the access right transmitted from the control unit;
executing via a first executing means:
(i) a request process for requesting the authentication information of the control unit and transmitting the command to request the access right when a first mode is set by the setting step;
(ii) a receiving process for receiving the authentication information transmitted by the request process; and
(iii) a reply process for sending a reply command of acquiring the access right when the authentication information received by the receiving process and the authentication information stored by storing step match; and
executing via a second executing means:
(i) the reply process for sending the reply command of acquiring the access right and transmitting the command to request the access right when a second mode is set by the setting step.

8. An information processing apparatus incorporated in a control unit, said control unit being connected to a plurality of other control units via a bus and accessed by one of said plurality of other control units that acquired a first access right, said information processing apparatus comprising:
storing means for storing authentication information given at a time of production of the control unit incorporating the information processing apparatus;
detecting means for detecting a connection of one of said plurality of other control units requesting access to said control unit;
supplying means for supplying the authentication information stored in said storing means to the one of said plurality of other control units, and storing the authentication information therein;
command receiving means for receiving a command to request the access right transmitted from the control unit;
first executing means for executing:
(i) a request process for requesting the authentication information of the control unit and transmitting the command to request the access right when a first mode is set by the setting means;
(ii) a receiving process for receiving the authentication information transmitted by the request process; and
(iii) a reply process for sending a reply command of acquiring the access right when the authentication information received by the receiving process and the authentication information stored by storing means match; and
second executing means for executing:
(i) the reply process for sending the reply command of acquiring the access right and transmitting the command to request the access right when a second mode is set by the setting means.

9. The information processing apparatus according to claim 8, wherein said bus is an IEEE 1394 high-speed serial bus and said authentication information is a Global Unique Identifier (GUID).

10. An information processing method for an information processing apparatus incorporated in a control unit, said control unit being connected to a plurality of other control units via a bus and accessed by one of said plurality of other control units that acquired a first access right, said information processing method comprising the steps of:
storing authentication information given at a time of production of the control unit incorporating the information processing apparatus;
detecting a connection of one of said plurality of other control units requesting access to said control unit;
supplying the authentication information stored in the storing step to the one of said plurality of other control units, and storing the authentication information therein;
receiving a command to request the access right transmitted from the control unit;
executing via a first executing means:
(i) a request process for requesting the authentication information of the control unit and transmitting the command to request the access right when a first mode is set by the setting step;
(ii) a receiving process for receiving the authentication information transmitted by the request process; and
(iii) a reply process for sending a reply command of acquiring the access right when the authentication information received by the receiving process and the authentication information stored by storing step match; and
executing via a second executing means:
(i) the reply process for sending the reply command of acquiring the access right and transmitting the command to request the access right when a second mode is set by the setting step.

11. A program storage medium storing a computer-readable program for controlling an information processing apparatus incorporated in a control unit, said control unit being connected to a plurality of other control units via a bus and accessed by one of said plurality of other control units that acquired a first access right, said program comprising the steps of:
storing authentication information given at a time of production of the control unit incorporating the information processing apparatus;
detecting a connection of one of said plurality of other control units requesting access to said control unit; and
supplying the authentication information stored in the storing step to the one of said other control units, and storing the authentication information therein;
receiving a command to request the access right transmitted from the control unit;
executing via a first executing means:
(i) a request process for requesting the authentication information of the control unit and transmitting the command to request the access right when a first mode is set by the setting step;
(ii) a receiving process for receiving the authentication information transmitted by the request process; and
(iii) a reply process for sending a reply command of acquiring the access right when the authentication information received by the receiving process and the authentication information stored by storing step match; and
executing via a second executing means:
(i) the reply process for sending the reply command of acquiring the access right and transmitting the command to request the access right when a second mode is set by the setting step.

12. An information processing system comprising a plurality of second control units connected to each other via a bus, and a first information processing apparatus incorporated in a control unit, said control unit being connected to one of said plurality of second control units via said bus and accessed by one of said plurality of other control units that acquired a first access right, said first information processing apparatus comprising:
setting means for setting a mode for acquiring an access right;
the one of said plurality of second control units comprising:
detecting means for detecting a connection of said first information processing apparatus that has received an access request from one of said plurality of said second control units;
storing means for storing authentication information given at a time of production of the control unit incorporating the first information processing apparatus;
supplying means for supplying the authentication information stored in said storing means to said first information processing apparatus, and storing the authentication information therein;
command receiving means for receiving a command to request the access right transmitted from the control unit;
first executing means for executing:
(i) a request process for requesting the authentication information of the control unit and transmitting the command to request the access right when a first mode is set by the setting means;
(ii) a receiving process for receiving the authentication information transmitted by the request process; and
(iii) a reply process for sending a reply command of acquiring the access right when the authentication information received by the receiving process and the authentication information stored by storing means match; and
second executing means for executing:
(i) the reply process for sending the reply command of acquiring the access right and transmitting the command to request the access right when a second mode is set by the setting means.

13. The information processing system according to claim 12, further comprising detecting means for detecting a connection to the one of said plurality of second control units,
wherein said setting means sets said first mode when said detecting means detects a connection to the one of said plurality of second control units while said detecting means sets said second mode when said detecting means detects no connection to the one of said plurality of second control units.

14. The information processing system according to claim 12, further comprising:
obtaining means for obtaining the authentication information from the one of said plurality of second control units via said bus;
comparing means for comparing the authentication information obtained by said obtaining means with authentication information held in said storing means; and output means for outputting a signal which allows control of said first information processing apparatus to the one of said plurality of second control units via said bus based on a result of the comparison by said comparing means.

15. The information processing system according to claim 12, wherein said setting means allows setting of the mode by a manual operation.

16. The information processing system according to claim 12, wherein said bus is an IEEE 1394 high-speed serial bus and said authentication information is a Global Unique Identifier (GUID).

17. An information processing method for an information processing system comprising a plurality of second control units connected to each other via a bus, and a first information processing apparatus incorporated in a control unit, said control unit being connected to one of said plurality of second control units via said bus and accessed by one of said plurality of other control units that acquired a first access right, the information processing method for said information processing system comprising an information processing method for said first information processing apparatus and an information processing method for the one of said plurality of second control units, the information processing method for said first information processing apparatus comprising the step of:

setting a mode for acquiring an access right;

and the information processing method for the one of said plurality of second control units comprising the steps of:

storing authentication information given at a time of production of the control unit incorporating the information processing apparatus;

detecting a connection of said first information processing apparatus that has received an access request from one of said plurality of said second control units;

supplying the authentication information stored in the storing step to said first information processing apparatus, and storing the authentication information therein;

receiving a command to request the access right transmitted from the control unit;

executing via a first executing means:
(i) a request process for requesting the authentication information of the control unit and transmitting the command to request the access right when a first mode is set by the setting step;
(ii) a receiving process for receiving the authentication information transmitted by the request process; and
(iii) a reply process for sending a reply command of acquiring the access right when the authentication information received by the receiving process and the authentication information stored by storing step match; and executing via a second executing means:
(i) the reply process for sending the reply command of acquiring the access right and transmitting the command to request the access right when a second mode is set by the setting step.

18. A program storage medium storing a computer-readable program for controlling an information processing system comprising a plurality of second control units connected to each other via a bus, and a first information processing apparatus incorporated in a control unit, said control unit being connected to one of said plurality of second control units via said bus and accessed by one of said plurality of other control units that acquired a first access right, the program for controlling said information processing system comprising a program for said first information processing apparatus and a program for the one of said second control units, the program for said first information processing apparatus comprising the steps of:

setting a mode for acquiring an access right;

and the program for the one of said plurality of second control units comprising the step of:

storing authentication information given at a time of production of the control unit incorporating the information processing apparatus;

detecting a connection of said first information processing apparatus that has received an access request from said one of said plurality of second control units; end supplying the authentication information stored in the storing step to said first information processing apparatus, and storing the authentication information therein;

receiving a command to request the access right transmitted from the control unit;

executing via a first executing means:
(i) a request process for requesting the authentication information of the control unit and transmitting the command to request the access right when a first mode is set by the setting step;
(ii) a receiving process for receiving the authentication information transmitted by the request process; and
(iii) a reply process for sending a reply command of acquiring the access right when the authentication information received by the receiving process and the authentication information stored by storing step match; and executing via a second executing means:
(i) the reply process for sending the reply command of acquiring the access right and transmitting the command to request the access right when a second mode is set by the setting step.

* * * * *